(12) United States Patent
Segler et al.

(10) Patent No.: US 10,540,268 B2
(45) Date of Patent: Jan. 21, 2020

(54) DETERMINING REQUIRED CAPACITIES FOR PROVISIONING PLATFORM SERVICES

(71) Applicant: SAP SE, Walldorf (DE)

(72) Inventors: Michael Segler, Sankt Leon-Rot (DE); Martin Steffke, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 14/880,182

(22) Filed: Oct. 9, 2015

(65) Prior Publication Data

US 2017/0103014 A1   Apr. 13, 2017

(51) Int. Cl.
*G06F 9/44* (2018.01)
*G06F 11/36* (2006.01)

(52) U.S. Cl.
CPC ................... *G06F 11/3688* (2013.01)

(58) Field of Classification Search
CPC .... G06F 9/5061; G06F 9/5066; G06F 9/5072; G06F 9/5077; G06F 11/34; G06F 11/3404; G06F 11/3409–3433; G06F 11/3442; G06F 11/3452; G06F 11/3466; G06F 11/3688
See application file for complete search history.

(56) References Cited

U.S. PATENT DOCUMENTS

| | | | | |
|---|---|---|---|---|
| 8,140,682 B2* | 3/2012 | Murthy | .................. | G06F 9/5061 709/223 |
| 8,260,603 B2* | 9/2012 | Cherkasova | ........ | G06F 11/3447 718/1 |
| 8,396,788 B2* | 3/2013 | Anke | .................... | G06F 9/5066 705/38 |
| 9,063,750 B2* | 6/2015 | Gupta | ................. | G06F 11/3447 |
| 2008/0033785 A1* | 2/2008 | Anke | .................... | G06F 9/5027 705/7.26 |
| 2010/0030877 A1* | 2/2010 | Yanagisawa | .......... | G06F 9/5077 709/221 |
| 2010/0082321 A1* | 4/2010 | Cherkasova | ........ | G06F 11/3447 703/22 |
| 2011/0153507 A1* | 6/2011 | Murthy | ................. | G06F 9/5061 709/223 |

(Continued)

*Primary Examiner* — Qamrun Nahar
(74) *Attorney, Agent, or Firm* — Fish & Richardson P.C.

(57) ABSTRACT

Application services run on a computing platform and consume platform services. Performance measurement units are defined for the application services. A number of relationships for consumption of resources are defined between one or more of the application services and one or more of the platform service. Performance tests are executed on an application service while consuming different capacities provided by one or more instances of consumed platform services. Results measuring performance of the application service during test executions are collected. Based on the collected results, scaling formulas are determined for each of the consumed platform services by the application service. A scaling formula defines a correspondence between a capacity provided by a first consumed platform service and measured performance of the application service. Based on the scaling formulas, required capacities of the consumed platform services may be determined with respect to a predefined performance of the application service.

12 Claims, 9 Drawing Sheets

(56) References Cited

U.S. PATENT DOCUMENTS

2013/0198723 A1* 8/2013 Gupta ................ G06F 11/3447
717/127
2015/0286507 A1* 10/2015 Elmroth ............. G06F 11/3442
718/104

* cited by examiner

DETERMINING REQUIRED CAPACITIES FOR PROVISIONING PLATFORM SERVICES

BACKGROUND

Software complexity is increasing which results in changes in product cycles, requirements and modes for delivering software applications. Software applications can adopt or get access to different services and capabilities from other software offerings. For example, they may consume resources and functionality provided by computing platforms, such as on-premise platforms or cloud platforms.

Cloud computing is the delivery of computing resources as a service over a network (e.g., the Internet). Software-as-a-Service (SaaS) is a type of a solution, where a cloud service provider allows software applications and various hardware and software resources on-demand when requested by an end user (e.g., customer). SaaS delivery refers to providing hosted software applications to customers and end users in a cloud-computing environment. Platform-as-a-Service (PaaS) is another category of cloud computing solutions that may give application developers the tools to design, develop, test, deploy and host their software applications, as well as use of platform services and infrastructure. PaaS is a growing technology space offering possibilities for optimization of information technology (IT) spending. It provides facilities required to support the lifecycle of web applications and services, available from the Internet. Applications can run as a SaaS on the infrastructure that is provided from a PaaS provider.

Applications running as on-demand or on-premise solutions perform operations on the underlying infrastructure while consuming provided resource of either a cloud or an on-premise platform. Scaling of the applications to respond to customers' demands is related to efficiency and capacity provided by the underlying infrastructure and consumed platform services. The underlying infrastructure provides resources so that users may utilize them during execution of the applications on the development platform in an acceptable manner.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for determining required capacities for provisioning platform services are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
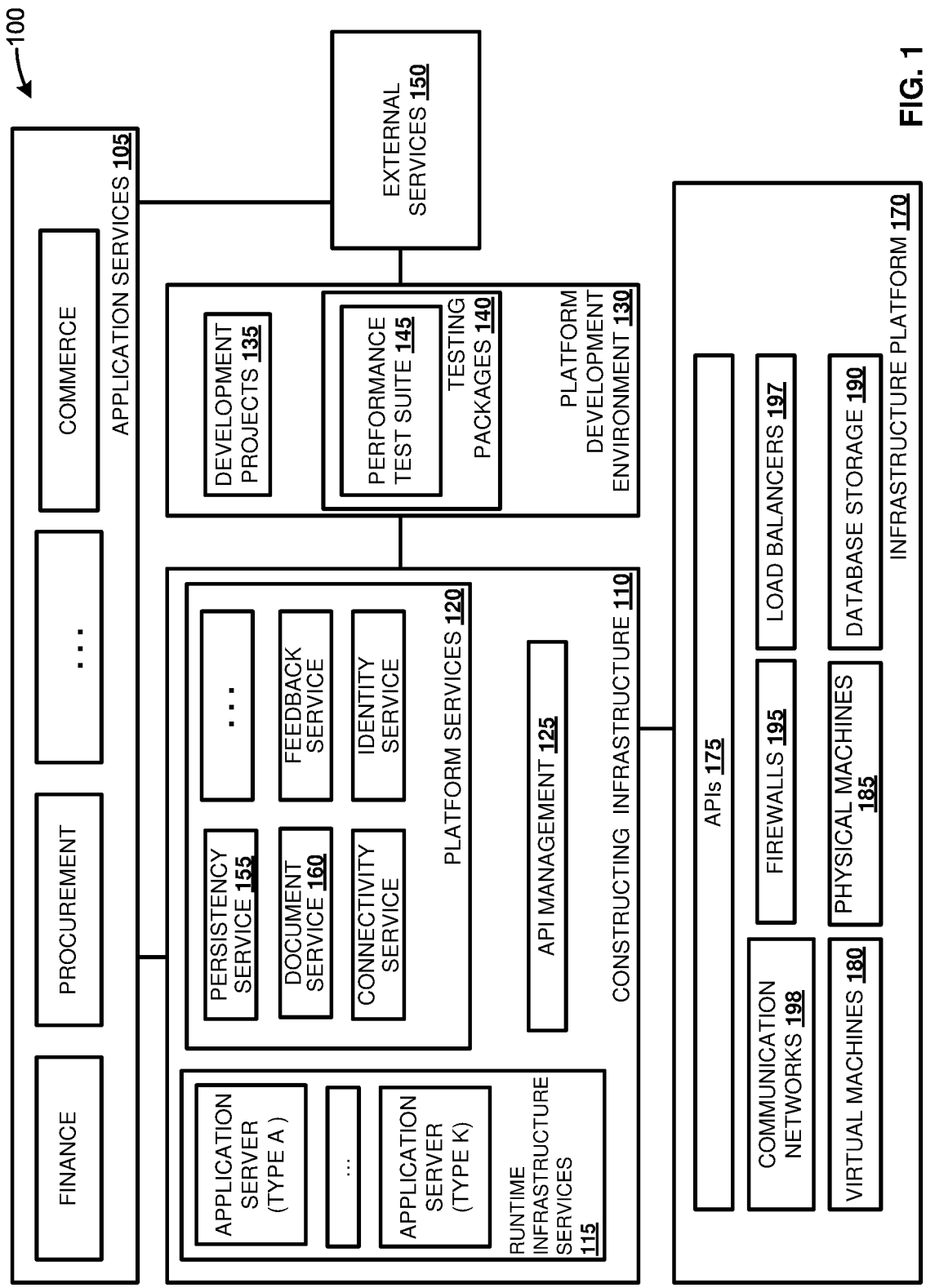
FIG. 1 is a block diagram illustrating an exemplary computing environment for providing application services, where the application services consume provisioned platform services, according to one embodiment.

FIG. 1 is a block diagram illustrating an exemplary computing environment 100 for providing application services 105, where the application services consume provisioned platform services, according to one embodiment. Application services 105 may be part of an application serving customers in a particular field, such as finance, procurement, commerce, etc. The application may be on-demand application or on-premise application provided on a platform. The on-demand application may be provided, for example, on top of a cloud platform. The on-premise application may be provided on an on-premise platform. The application may be built from a number of application services, which consume different services providing different functionality and infrastructure. The computing environment 100 includes a constructing infrastructure 110, a platform development environment 130, and an infrastructure platform 170. The constructing infrastructure 110 may include platform services, such as a runtime infrastructure services 115 and platform services 120. The constructing infrastructure 110 may include an application programming interfaces (API) management module 125. The runtime infrastructure services 115 may provide platform services related to runtime infrastructure resources. The runtime infrastructure services 115 may provide a set of application servers of different types to be installed on computer instances, for example physical or virtual machines (VMs) with running operating systems (OS). The provided platform services 120 and the runtime infrastructure services 115 may be consumed by the application services 105. The platform services 120 may be such as persistency service 155, document service 160, connectivity service, feedback service, identity service, etc. The persistency service 155 may be a service that makes available both in-memory and relational database storages to applications that are hosted on the platform. The persistency service 155 may further provide features to manage databases and provide means to access database storages, means for backup and recovery, load balancing features, scaling functionality, etc. The document service 160 may provide a content repository for unstructured or semi-structured content. The API management module 125 may be related to a process for publishing, promoting, and managing APIs provided by the platform services 120 in a secure and scalable manner. Further, the API management module 125 may include end-user support resources that define and document the APIs.

Further, the application services 105 may consume external services 150 that may be provided from other service vendors, apart from a vendor of the constructing infrastructure 110 and/or the vendor of the platform services 120. The external services 150 may be services that are provisioned on runtime infrastructure not provided by the constructing infrastructure 110. An external service from the external services 150 may provide APIs accessible by the application services 105. In such manner, the external service may be integrated in a service from the application services 105 and the functionality provided by the external services may be integrated into the functionality of the application service. In one embodiment, the external services 150 include services that provide features similar to features provided from the platform services 120 but developed in a different manner with different techniques and specifics. In alternative embodiments, the external services 150 include services that provided additional features that are not provided by the platform services 120 and which are integrated into functionality of one or more application services from the application services 105. The external services 150 may further include external infrastructure service that provide infrastructure resources for consumption by application services from the application services 105 and platform services from the platform services 120.

In one embodiment, the platform development environment 130 may include development projects 135 that may be created when an application service from the application services 105 is created. The development projects 135 may include programming code together with metadata, software requirements, etc. that are related to developing the application service. The application services 105 may consume platform services provided by the constructing infrastructure 110. The efficiency of the application services 105 may be associated with a configuration of the underlying infrastructure. The capacity provided by the consumed platform services from the platform services 120 and the runtime infrastructure services 115 may impact performances of the application services 105. The demanded resources provided by the consumed platform services for consumption by the application services 105 may increase according to customers' preferences for the performances of the application services 105. The relationship between an application service and consumed platform services is complex. It is possible that the capacity provided by the consumed platform services may be required to grow non-linearly when there is an increase in the load of the application service.

Testing packages 140 may be created in relation to the application services 105. The testing packages 140 may include test suite 145 that defines tests to be run on the application services 105 in order to measure performance of the application services 105. The measured performance may be defined in performance measurement units correspondingly defined for the application services 105. The performance of the application service is associated with capacity of consumed platform service. The capacity defined the volume of resources that are allocated to a given consuming application service. For example, the performance tests from the performance test suite 145 may measure throughput of an application service. Throughput may be defined as a number of transactions produced over time during a performance test. There may be a service level agreement (SLA) defined for an application service running on top of the platform, e.g. a cloud platform. The SLA defines an agreed upon desired throughput to be provided to a contracted customer. For example, 10 transactions per second. The performance tests from the performance test suite 145 may measure the defined desired throughput from such an SLA.

The constructing infrastructure 110 may be related to the platform development environment 130 and to the infrastructure platform 170. In one embodiment, the constructing infrastructure 110 and the platform development environment 130 may be provided as one cloud platform for developing and deploying on-demand applications. In yet another embodiment, the platform development environment 130 may not be part of a cloud platform and may communicate with a cloud platform through a remote secure connection. The platform development environment 130 may further be related to external services 150, which may be accessed and invoked when building a project from the development projects 135. The infrastructure platform 170 may be associated with an IaaS solution provided by a service vendor. The infrastructure platform 170 may provide APIs 175, communication network 198, firewalls 195, load balancers 197, virtual machines (VMs) 180, physical machines 185, and database storage 190, that may be utilized by the constructing infrastructure 110. The resources provided by the infrastructure platform 170 may be integrated with the constructing infrastructure 110. The application servers provided by the runtime infrastructure services 115 of the constructing infrastructure 110 may be installed on VMs from the virtual machines 180.

In one embodiment, an application—"Shopping App" may be deployed in the computing environment 100 on a provided runtime infrastructure. The "Shopping App" may provide better shopping experience to customers through a number of features, for example advertising pop-ups, e-mail receipts, bar code scanning, etc. The "Shopping App" may incorporate one or more of the application services 105. A first application service from the application services 105 may be integrated in the "Shopping App". The first service may provide features to offer special discount offers, e.g. for a store or a brand, on a mobile device. The first application service may be deployed on runtime infrastructure provided by the runtime infrastructure services 115 from the constructing infrastructure 110. The "Shopping App" may further include a second application service that allows to checkout purchases through a mobile device and to receive a receipt on the mobile device.

Applications, such as the "Shopping App", including application services from the application services 105, may run as multitenant applications on top of a cloud platform. The applications may be installed and started on a cloud platform runtime infrastructure. In one embodiment, the cloud platform runtime infrastructure may include virtualized hardware with application runtime containers to host applications comprising one or more of the application services 105. The cloud platform runtime infrastructure may further host platform services provided by the cloud platform, etc. The virtualized hardware includes VMs, which are emulated computing systems with installed and running OS. The application runtime containers comprise application servers, which may be profiled and may serve different requirements of the application services 105. For example, a cloud platform may provide runtime for Java® applications that may include virtualized hardware resources, and application runtime containers with running Java Virtual Machines (JVMs). The JVMs are abstract computing machines that enable an emulated computing system to run a Java program. When the JVMs are provided by the cloud platform, they may be enhanced with additional supportability and developer features, together with extensive monitoring and tracing information. These features may be designed as interactive, on-demand facilities of the JVMs with minimal performance impact. They can be switched on and off without having to restart a Java Virtual Machine (JVM) or an application server that uses the JVM. The applications may run on the application runtime containers, where they may consume APIs of platform services, such as the platform services 120 provided in the computing environment 100, and Java® Platform, Enterprise Edition (Java EE) APIs according to standard patterns. The computing environment 100 may provide different types and profiles for the application runtime containers.

The "Shopping App" may be hosted on a virtualized hardware with certain central processing unit (CPU), main memory, disk space and an installed OS. In one embodiment, the "Shopping App" may be hosted on a virtual machine from the VMs 180, where an application runtime container with an application server is installed. The application server may be selected from different types of application servers provided by the runtime infrastructure services 115 from the constructing infrastructure 110. The "Shopping App" may have several application services from the application services 105, including the first application service and the second application service discussed above. The application services part of the "Shopping App" may be hosted on VMs with 1 CPU and 2048 megabytes (MB) main memory, where an application server of type A is installed. The application server may be part of an application runtime container. In one embodiment, on the application server there may be a JVM when the application is a Java application. The application services part of the "Shopping App" may consume one or more of the platform services 120 that are provided by the consuming infrastructure 110. Further, the application services part of the "Shopping App" may consume one or more of the external services 150. The platform services 120 may be instantiated on runtime provided by the runtime infrastructure services 115 by the constructing infrastructure 110. The application services part of the "Shopping App" may be hosted on different types of application servers running on VMs providing different capacity of consumed platform resources. Different capacities of platform resources may be requested based on requirements for performance of the application services. For example, the first application services may run on a VM with 1 CPU and 2 gigabytes (GB) Random-access memory (RAM), and the second application service may run on a VM with 4 CPUs and 8 GB RAM. Types of VMs and application servers may be selected when instantiating an application service from the application services 105.

Figure 2:
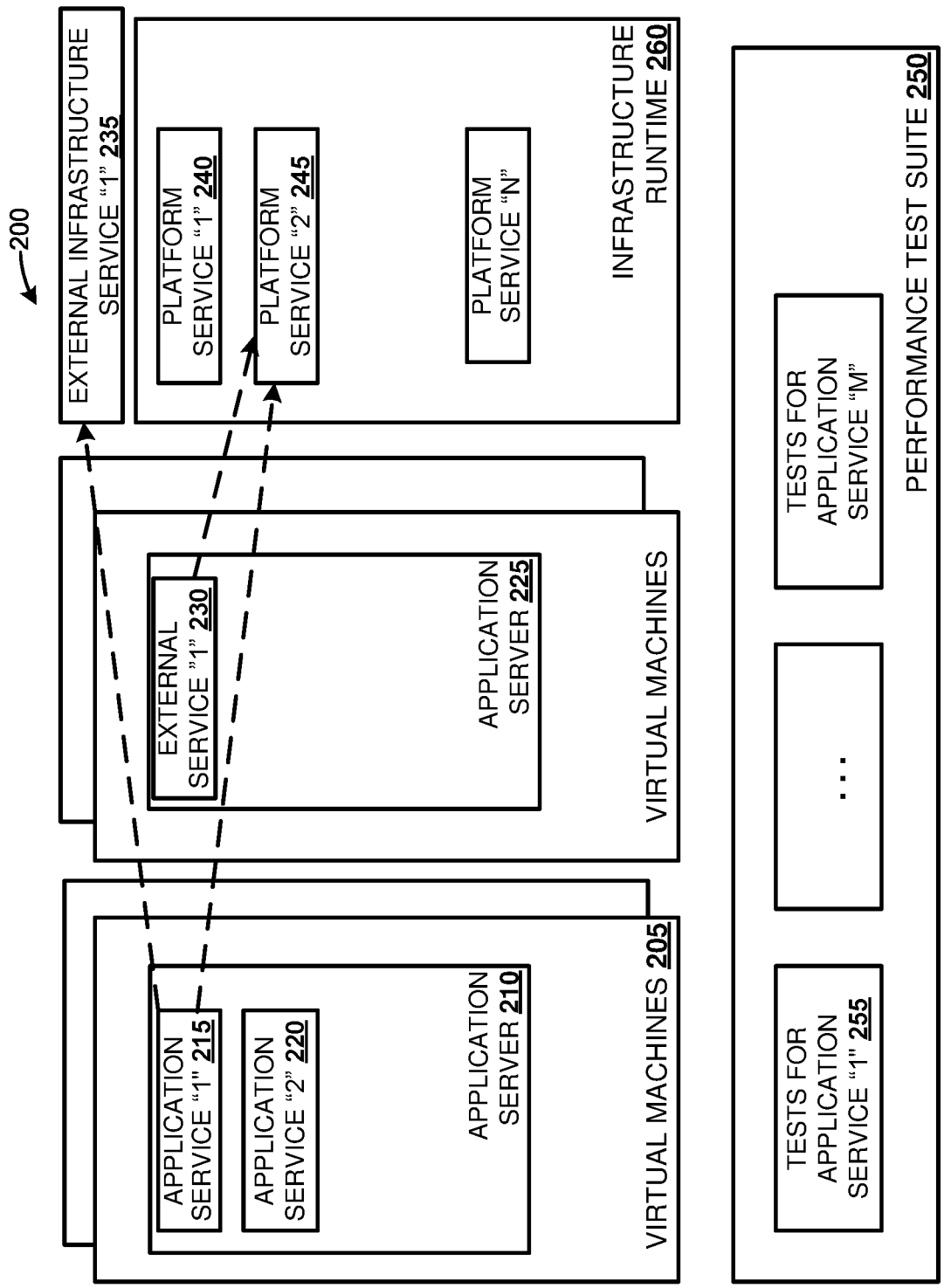
FIG. 2 is a block diagram illustrating an exemplary cloud computing environment comprising deployed application services consuming platform services and a performance test suite to measure performance of the application services, according to one embodiment.

FIG. 2 is a block diagram illustrating an exemplary cloud computing environment 200 comprising deployed application services consuming platform services and a performance test suite 250 to measure performance of the application services, according to one embodiment. The cloud computing environment 200 may be such as the computing environment 100, FIG. 1. The cloud computing environment 200 may include a cloud platform that provides infrastructure resources, constructing infrastructure, platform services deployed on VMs, etc. The provided infrastructure resources, constructing infrastructure, platform services, etc. by the cloud platform may be utilized for developing and deploying application services incorporated in on-demand applications. The on-demand applications integrate functionality from provided platform services, consume infrastructure resources and run as cloud application on top of the cloud platform. A set of VMs may be selected and instantiated from an infrastructure platform, such as the infrastructure platform 170, FIG. 1. Virtual machines 205 may be one or more VMs with installed application servers, such as application server 210. The VMs may be of different types. A VM of a type "Lite" may define capacity provided in form of computing resources, for example 1 CPU, 2 GB RAM. Other VMs may provide different infrastructure configurations, e.g. 2 CPU, 4 GB Ram; 8 CPU, 16 GB RAM; etc. The application servers, such as the application server 210 may be selected from a set of profiles for application servers and respective application runtime containers, as provided by a constructing infrastructure, such as the constructing infrastructure 110, FIG. 1. Application service "1" 215 and application service "2" 220 run on the virtual machines 205 and the application server 210. The application service "1" 215 and the application service "2" 220 may be such as the first application service and the second application service part of the "Shopping App" discussed above in relation to FIG. 1. Application services part of an application, which services are deployed on a cloud platform, are not limited to be hosted on one and the same VMs.

In one embodiment, the application service "1" 215 may consume infrastructure resources provided by the VMs 205 and the application server 210. The application service "1" 215 may consume platform services instantiated on infrastructure runtime 260. Further, the application service "1" 215 may consume an external service "1" 235 instantiated on a VM with a running OS and an installed application server profiled, for example, for Java® web applications. The external service "1" 235 may be provided by a service provider in the cloud computing environment 200. The external service "1" 235 may include features that are consumed by the application service "1" 215. The infrastructure runtime 260 may be runtime provided by a constructing infrastructure, such as the constructing infrastructure 110, FIG. 1.

In one embodiment, the infrastructure runtime 260 may host a number of instances of platform services, such as the platform services 120, FIG. 1 The platform services that are instantiated on the infrastructure runtime 260 include platform service "1" 240, platform service "2" 245 through platform service "N". The instantiated platform services on the infrastructure runtime 260 may expose APIs that are consumable by application services, such as the application services 105, FIG. 1. The application service "1" 215 may consume an instance of platform service "2" 245. For example, the platform service "2" 245 may be a service that provides an unstructured storages of different volume sizes, for example. An instance of the platform service "2" 245 may be an unstructured storage of 64 GB, or an unstructured storage of 128 GB, etc. An application M 230 includes a plurality of application services that consume platform services provided by the cloud platform. The application "M" 230 is instantiated on VMs with a running application server 225. For example, the VMs that host the application "M" 230 may be of type "Premium" that defined 4 CPUs and 8 GB RAM as computing resources to be consumed by the application "M" 230.

The cloud computing environment 200 includes a performance test suite 250, such as the performance test suite 145, FIG. 1. The performance test suite 250 includes tests that are designed to measure performance of application services, such as the application service "1" 215, application service "2" 220, etc. For an application service, a set of tests may be designed. In one embodiment, tests for application service "1" 255 are designed and developed to be run on top of the application service "1" 215 in different cases of consumption of services provided by the cloud platform. The application service "1" 215 may consume infrastructure resources provided as a service in the cloud computing environment 200. The application service "1" 215 may consume platform service instances of platform services provisioned in the cloud computing environment 200. The application service "1" 215 may consume different capacities provided by instances of consumed platform services that may impact performance of the application service "1" 125. For example, a set of tests from the tests for application service "1" 255 may be designed for a case when the application service "1" 215 runs on one VM, emulating a computer system with 1 CPU and 2 GB RAM. A different test case may be when the application service "1" 215 is hosted on 2 VMs, emulating two computer systems with 1 CPU and 2 GB RAM. The VMs have an installed application runtime container with an application server. The application service "1" 215 may run on the installed application runtime container, which allows the application service "1" 215 to consume standard Java® EE APIs and platform services, such as the platform service "2" 245. The test from the tests for application service "1" 255 may test the performance of the application service "1" 215, while running on the testing infrastructure configuration providing different capacities from instances of consumed platform services. Through executing the tests, throughput of the application service "1" 215 in an overload situation may be determined. Running tests from the performance test suite 250, may allow to determine limits of applications including application services, such as the application service "1" 215. Through running the tests for application service "1" 255 with respect to consumed runtime infrastructure service provided by runtime resource service with 1 CPU and 2 GB RAM, test results may be collected. The test results may be analyzed to determine impact of hosting infrastructure.

Figure 3:
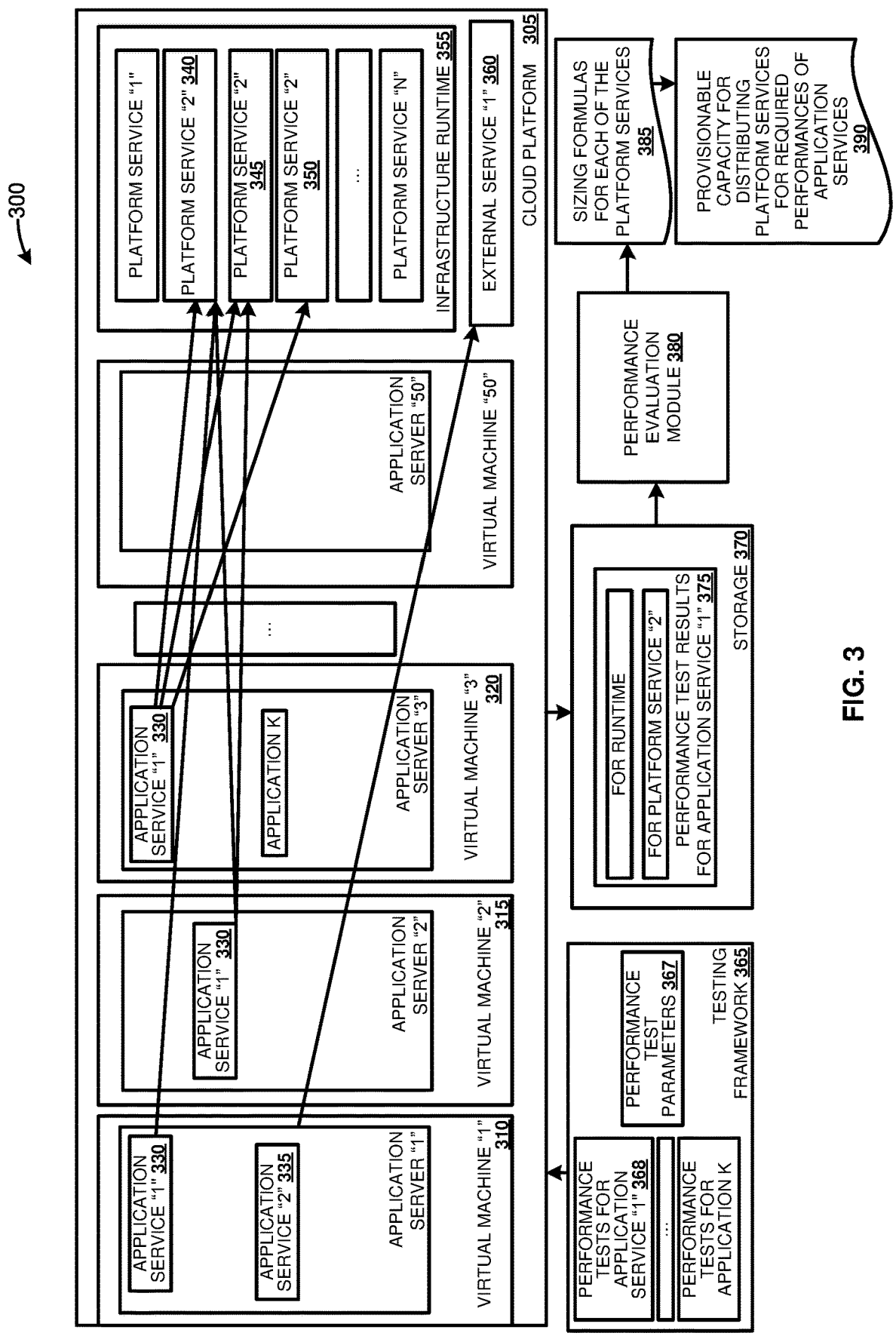
FIG. 3 is a block diagram illustrating an exemplary cloud environment for executing performance test for measuring performance of application services while consuming different platform service capacities provided by instances of platform service, according to one embodiment.

FIG. 3 is a block diagram illustrating an exemplary cloud environment 300 for executing performance test for measuring performance of application services while consuming different platform service capacities provided by instances of platform service, according to one embodiment. The cloud environment 300 includes a cloud platform 305, a testing framework 365, and a storage 370. The cloud platform 305 may be such as the cloud platform discussed in relation to FIG. 1 and FIG. 2. The cloud platform 305 may further include a constructing infrastructure providing platform services, API management, and runtime environment. The application services that run on top of the cloud platform 305 may be designed and developed through a development environment, which may be part of the cloud platform 305. In one embodiment, the development environment may be such as the platform development environment 130, FIG. 1. The application services may consume platform services provided on the cloud platform, such as the platform services 120, FIG. 1, and further may consume external infrastructure services, such as the external services 150, FIG. 1 The platform services may be instantiated on the cloud platform 305 and the platform services may provide different service capacities through different sets of instances to be consumed by the application services. The service capacities that may be provided by a platform service may be defined on a capacity scale defined for the platform service. Different instances of the platform services may be consumed by the application services. For example, when an application service consumes a platform service provided with a particular capacity, the performance of the application service may differ from performance of the application service that may be achieved if a capacity of a platform service is of a higher volume. The performance of the application service may be measured through executing performance tests and collecting test results. The performance of the application service may be in a measurement unit defined for the application service. For example, for an application service that provides functionality for checking out purchases through a cell phone, the performance of the application service may be measure in a measurement unit such as transactions per hour.

The cloud platform 305 includes infrastructure runtime 355 that hosts platform services provided for consumption by application services that are deployed on the cloud platform 305. Further, the cloud platform 305 includes external service "1" 360, which is also hosted on the cloud platform 305 and provides APIs to be consumed by application services. In another embodiment, the external service "1" 360 may not be hosted on the cloud platform 305. The external service "1" 360 may be hosted on an external provided infrastructure and be consumed by the application services that run on the cloud platform 305.

The cloud platform 305 includes a set of VMs to host the application services. Application service "1" 330 and application service "2" 335 run on Virtual machine "1" 310 with an installed application server "1". The application service "1" 330 and application service "2" 335 consumes provided infrastructure resources when hosted on VM "1" 310 with an application server "1", provided by the cloud platform 305. Application service "1" 330 and application service "2" 335 may be such as the first and second application services part of the "Shopping App" discussed in relation to FIG. 1. A second and a third instance of the application service "1" 330 may run on Virtual machine "2" 315 and Virtual machine "3" 320. The instance of application service "2" 335 running on VM "1" 310 may consume the external service "1" 360.

In one embodiment, a development environment may be used to design and develop performance test for the application services. The performance tests may be executed to measure performance of the application services in an overload situation. Results collected from performance tests may be in measurement units defined for the application services. The measurements units may correspond to the functionalities that the application services provide. A testing framework 365 includes a set of performance test for the application services provisioned on the cloud platform 305. In one embodiment, the testing framework 365 may be integrated with the development environment. In another embodiment, the testing framework 365 may receive the set of performance test for the application services from an external source. The testing framework 365 comprises performance tests that may be aggregated per application service that run on the cloud platform, or may be aggregated for an application that run on the cloud platform 305. The testing framework 365 comprises performance tests for application service "1" 368. For example, if an application "A" comprises application services "A1" and "A2", then performance tests for application A comprises test for both application services "A1" and "A2". The testing framework 365 further comprises performance tests for application "K".

In one embodiment, the application service "1" 330 may consume different capacities of services provided by the cloud platform 305. The application service "1" 330 consumes an infrastructure platform service provided by the cloud platform 305. The consumed infrastructure platform service may provide virtualized hardware resources in form of one or more VMs with application servers installed. The application service "1" 330 may be hosted on a number of VMs and thus consume different capacity of the infrastructure platform service, for example installed on one VM, on two VMs, on three VMs, and so forth. The application service "1" 330 may further consumes different service capacities provided by instances of the platform service, hosted on the cloud platform 305. A first capacity provided by a first platform service may be provided by one or more instances of the first platform service. The number of instances that provides a given capacity of a platform service may be determined according to a type of the platform service and a scaling mode of the platform service. The scaling mode of the platform service may define a structure ordering point at fixed intervals. The scaling mode may be used as a reference standard in measurement of capacity provided by the platform service. A linear scaling mode may define that a capacity provided by instances of a platform service may increase linearly. If the scaling mode of the platform service is linear, then different capacities of the platform service may be provided by a different sets comprising different number of equal instances of the platform service. For example, for a platform service that is an outgoing mail server, the scaling mode may define different capacities provided by one mail server instance, two mail server instances, etc. The capacity of such a platform service may be measured by a number of provided instances of mail servers. If the scaling mode of the platform service is a stepped mode, then different capacities of the platform service may be provided by different instances of the platform service providing different amount of resources. For example, for a platform service that is a data storage, different capacities of that platform service may be provided by different instances providing 16 GB storage, 32 GB storage, 64 GB storage, and so on. The capacity of such a platform service may be measured in a number of GBs on a stepped scale. Instances of a platform service hosted on the cloud platform 305 may have equal capacity, such as instances of a platform service providing runtime infrastructure on a VM with 1 CPU and 2 GB RAM.

In one embodiment, the application service "1" 330 may consume platform services hosted on the infrastructure runtime 355. The application service "1" 330 may consume one instance of a platform service, such as platform service "1", may consume two instances of the platform service "1", or may consume three instances of the platform service "1". When consuming different set of instances of the platform service "1", the application service "1" 330 consumes different capacities of resources provided by the platform service "1". In another embodiment, the instances of the platform service "1" may have different capacity. For example, the platform service "1" may provide different capacity from different instances of the platform service, when a capacity scale for the platform service "1" is in a stepped scaling mode. Therefore, when the application service "1" consumes two different instances of the platform service "1", than the application service "1" may consumes two different capacities provided by the platform service "1".

Further, the platform service "N" hosted on the infrastructure runtime 355 may be a service providing unstructured storage, and a size of an instance of the platform service "N" may be selected on a capacity scale. For example, a stepped scale defining a number of steps in an increasing order may be defined for platform service "N". The stepped scaling may define a scale of 5 steps within a capacity limit range staring from 65 GB up to 1024 GB. Respectively a first step may be 64 GB, a second step may be 128 GB, third step may be 256 GB, a fourth step may be 512 GB, and a fifth step may be 1024 GB.

In yet another embodiment, the application service "1" 330 consumes instance of platform service "2" provisioned on the cloud platform 305. The application service "1" 330 consumes three instances of platform service "2"—platform service "2" 340, platform service "2" 345, platform service "2" 350. The three different instances of platform service "2" are provided for consumption by the application service "1". The three different instances of platform service "2" may be instantiated to provide different capacity of the platform service "2" for consumption of application services on the cloud platform 305. For example, the capacity that may be provided from platform service "2" is defined on a capacity scale of the platform service "2". The capacity scale of the platform service "2" may have a limited range. The capacity scale of the platform service "2" may be in a linear scaling mode. A linear scaling mode may define that a capacity provided by instances of a platform service may increase linearly. For example, if the platform service "2" is a service that provides functionality of outgoing mail servers, capacity of instances of platform service "2" may be defined to start from a one server instance and to increase with an increment of one more sever, within the limit range up to 50 mail outgoing servers. Then, the application service "1" 330 (running on VM 310) may consume only one instance—platform service "2" 340, the application service "1" 320 (running on VM 315) may consume two instances—platform service "2" 340 and platform service "2" 345, and the application service "1" 320 (running on VM 320) may consume three instances—platform service "2" 340, platform service "2" 345, and platform service "2" 350.

A test from the performance tests for application service "1" 368 may be executed on an instance of the application service "1" 330 that runs on the runtime provide by the cloud platform 305, for example the instance of the application service "1" 330 which is hosted on VM "1" 310. Further, the test may be run on two instances of the application service "1" 330 that run on VM "1" 310 and VM "2" 315. The test may be also be run on three instances of the application service "1" 330 that run on VM "1" 310, VM "2" 315, and VM "3" 320. Moreover, the test may be run on a number of instance of the application service "1" 330 when consuming different number of instances of platform service "2". For example when consuming three instances of platform service "2"—the platform service "2" 340, the platform service "2" 345, and the platform service "2" 350. Tests from the performance tests for application service "1" 368 may be execute on different configurations of simultaneous consumption of resources provided by one, two, three, other number of instances of platform service "2".

Performance test parameters 367 may be defined from the testing framework 365. The performance tests parameters 367 may include significance thresholds for tests related to the different application services running on the cloud platform 305. A significance threshold defined for the application service "1" 330 may be used to determine whether a difference in performance of the application service "1" 330 during consumption of the two platform service capacities provided by instances of a platform service is significant. The significance threshold may be compared with a performance rate of the application service "1" 330 measuring difference in the performance of the application service "1" 330 during consumption of the two platform service capacities. When the performance is above the significance threshold, it may be determined that the given platform service is significant for the performance of the application service "1" 330. A platform service is significant for the performance of an application service, when a change in the provided capacity from the platform service results in an indicative change in the performance of the application service.

The application services deployed on the cloud platform 305 consume cloud resources provided by the platform services while running on the runtime infrastructure. The application services may be provided in form of cloud applications, where a cloud application may comprise one or more application services. The cloud applications may be designed for customers of the cloud platform 305 and used by end-users. The cloud applications may be such as the "Shopping App" discussed in relation to FIG. 1. The customers of the cloud platform 305, that build on-demand applications on top of the cloud platform 305, may request a desired performance of the on-demand applications. The desired performance that is agreed upon may reflect required performances of the application services that are included in the on-demand application. The required performances of the application services may impact the demand for service capacity provided by the consumed platform services, including the services providing runtime resources. The required performances of the application service may be associated with a capacity that is provided by one or more instances of a consumed platform service. Different instances of a platform service may provide different capacity of the service for consumption. For example, for a platform service that provides data storage, one instance may provide 16 GB and another may provide 32 GB. On the other hand, it is possible that the platform service provides data storage from 2 instances of the same size, e.g. 2 storages of 16 GB. The capacity provided by a platform service may be defined on a capacity scale related to a scaling mode. The scaling mode may be associated with the functionality and resources that are provided by the platform service. The capacity may define the amount of resources provided by the platform service. The capacity of the platform service may be defined as a number of instances of the service provided in a fixed size, or as an instance of a particular capacity size.

The performance test for application service "1" 368 are executed on the application service "1" 330 when running on a various sets of VMs on the cloud platform 305 and consuming different capacities provided by differently sized instances of consumed platform services. A storage 370 may store collected performance test results for application service "1" 375. The performance test results for application service "1" 375 may further include results from tests measuring performance of the application service "1" during consumption of platform services provided on the cloud platform 305. The performance test results for application service "1" 375 may be include results for runtime infrastructure consumption and results for consumption of platform service "2". The results for the runtime may be stored, for example, in a table comprising test results when the application service "1" 330 is tested while running on one VM, on two VMs, etc. A test may be executed while the application service "1" 330 consumes different capacities of the platform service "2" that may be provided by different sets of instances of the platform service "2", such as the platform service "2" 340, the platform service "2" 345, the platform service "2" 350. The capacities that are provided by instances of the platform service "2" may be defined according to a capacity scale for the platform service "2". The capacity scale may define that the capacity of platform service "2", which is provided for consumption by application services on top of the cloud platform 305, is measure in a number of instances of a resource provided by the platform service "2". For example, if the platform service "2" is an outgoing mail server service, then the capacity provide by the platform service "2" may be measured in a number of servers that are allocated and consumed by the application service "1". The results for the consumption of platform service "2" by the application service "1" may also be stored in a table comprising test results from executed tests.

In one embodiment, the stored performance test results for application service "1" 375 and for other application services deployed on the cloud platform 305 are evaluated by a performance evaluation module 380. Based on the evaluation, scaling formulas for the platform services 385 that provided by the cloud platform 305 may be determined. The scaling formulas may be determined for the platform services, which are consumed by the application service "1" and by other application services, deployed on the cloud platform 305. The scaling formulas may define correspondence between performance of an application service and capacity provided by a consumed platform service. The consumed platform services may provide different capacities for consumption by the application service through instances of the platform services. The instances of the platform services may provide different resources including runtime infrastructure resources and/or other functionality and resources. Based on the scaling formulas and capacity limit ranges for the platform services that are provided by the cloud platform 305, service capacities for provisioning instances of the platform services for required performances of the application services 390 are determined.

Figure 4:
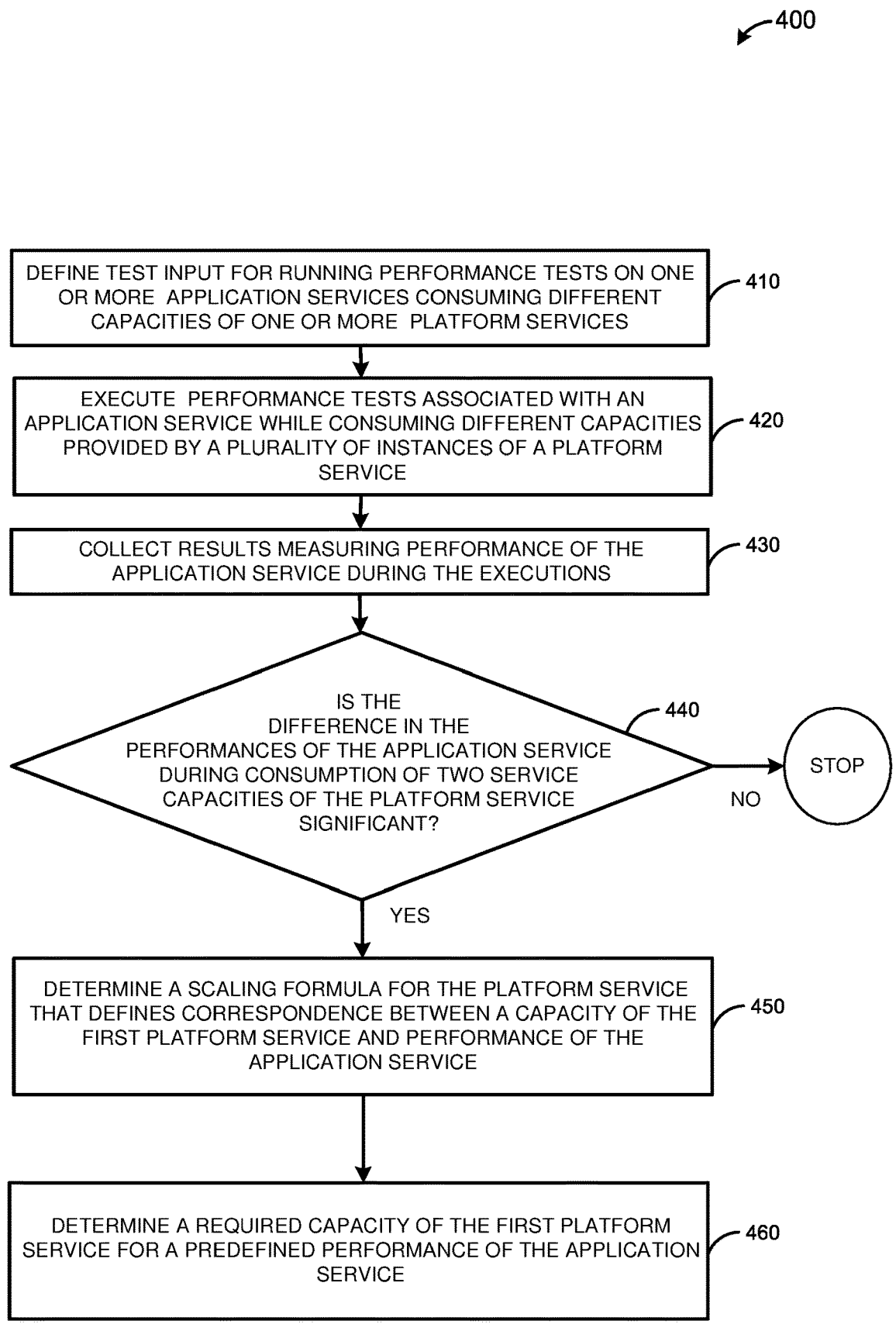
FIG. 4 is a flow diagram illustrating a process for determining a required service capacity of a platform service consumed by an application service, according to one embodiment.

FIG. 4 is a flow diagram illustrating a process 400 for determining a required service capacity of a platform service consumed by an application service, according to one embodiment. At 410, a test input for running performance tests on one or more application services consuming different capacities provided by one or more platform services is defined. The one or more application services and the one or more platform services may be provisioned on a cloud platform such as the cloud platform 305, FIG. 3. An application service from the one or more application services consumes a provided capacity by one or more instances of the platform service. The instances of the consumed platform service are instantiated on the cloud platform to provide different service capacities defined on a capacity scale for the consumed platform service.

The definition of the test input may include defining the platform services provided by the cloud platform together with corresponding capacity limit ranges for instantiating platform service instances on capacity scales. Further, the definition of the test input may further include definition of application services to run on the cloud platform and to consume provided platform services by the cloud platform. Performance measurement units may be defined for each of the application services. For example, the definition of the platform services and the application services may be provided in form of a table.

The test input defined at 410 may include relationships between the one or more application services and the one or more platform services. The test input may include mappings between an application service consuming one or more of the platform services and vice versa, as a platform service may be consumed by more than one application services. Further, the test input may identify performance test to be executed on the application services. The performance tests may be such as the performance tests from the testing framework 365, FIG. 3. The test input may further define a performance test parameter, such as a significance threshold, as described in relation to the performance test parameters 367, FIG. 3. The test input may include information about the execution of the performance test such as defining a minimum number of platform services instances to be tested, defining prerequisites for service capacities to be tested, etc.

At 420, performance tests associated with an application service are executed. The application service may be such as the application service "1" 215, FIG. 1, or the application service "1" 330, FIG. 3. The application service may consume different capacities provided by a plurality of platform service instances of a platform service. The application service may be tested to determined application service performance during consumption of the plurality of instances defining different service testing capacities. At 430, based on the executions of the tests, results are collected that measure the performance of the application service in different test scenarios. The collected results measuring the performance of the application service may be in a performance measurement unit defined for the application service.

At 440, it is determined whether the difference in the performances of the application service during consumption of two service capacities of the platform service is significant. The difference is significant, when a performance rate of the application service is higher than a predefined significance threshold. The performance rate of the application service is a rate computed with reference to a consumed platform service. The performance rate may be computed based on a ratio between performances of the application service during consumption of two platform service capacities of the consumed platform service. The performances of the application service in the two different cases are measured and test results are collected at 430. The performance rate may be computed with a formula that takes into consideration the performances of the application and the different capacities that are provided by the consumed platform service. The performance rate may be a percentage number that is comparable with a significance threshold, which may also be defined as a percentage number. The significance threshold may be defined within the definition of the test input at 410. The significance threshold may be for example 25%. The performance rate may be computed according to the following formula:

$$\text{Performance rate} = \frac{\frac{\text{performance(capacity 2)}}{\text{performance(capacity 1)}} - 1}{\frac{\text{capacity 2}}{\text{capacity 1}} - 1}, \quad (1)$$

where Capacity 1 and capacity 2, as presented in formulas (1), are the capacities that are provided by the platform service. Capacity 1 and capacity 2 may be defined in an increasing order. Performance (capacity 1) and Performance (capacity 2) are measured performances of the application service when consuming respectfully capacity 1 and capacity 2, both provided by the platform service.

In an example, an application service "A" is hosted on a cloud platform and the performance of the application service is measured in transactions per hour. When the application service "A" runs on one and on two VMs, the performance of the application service "A" is measured through running performance test. The measured performance for the application service "A" when running on one VM is 10000 transactions per hour, and when running on two VMs—15000 transactions/hour. Then, a performance rate for the application service "A" may be computed in the following manner:

$$\text{Performance Rate} = \frac{\frac{15000}{10000} - 1}{\frac{2}{1} - 1} = \frac{1.5 - 1}{1} = 0.5. \quad (2)$$

The computed performance rate at (2) equals 50%, which may be compared to a defined significance threshold, e.g. 25%. The performance rate is greater than 25%, then a change in the provided capacity by the platform service providing runtime infrastructure impacts the performance of the application service "A". When it is determined, at 440, that the performance rate of the application service is less than the significance threshold, the process 400 stops. When it is determined at 440 that the performance rate is greater than the significance threshold, the process goes to 450.

At 450, based on the collected results, a scaling formula for the first platform service is determined. The scaling formula defines correspondence between a capacity of the first platform service and performance of the application service. The scaling formula may define as an equation in form of a function Y that is computed based on an expression taking as a parameter the performance of the application service, as in formula (3):

$$Y=f(X), \quad (3)$$

where Y is the capacity, and X is the performance of the application service.

Based on the scaling formula, at 460, a required capacity of the first platform service may be determined. The required capacity is determined by providing a predefined performance of the application service as the input variable "X" in the equation (3) and computing the unknown capacity Y. For example, for a requested performance for the application service "A", which consumes a runtime infrastructure service, a required capacity of the runtime service may be determined. The required capacity may be computed based on a scaling formula of the runtime infrastructure service.

The result may be such that a service capacity of four VMs is required to support the desired performance. In other examples of other application services consuming different platform services, five mail servers may be required, or an unstructured data storage of 64 GB may be required, etc.

Figure 5:
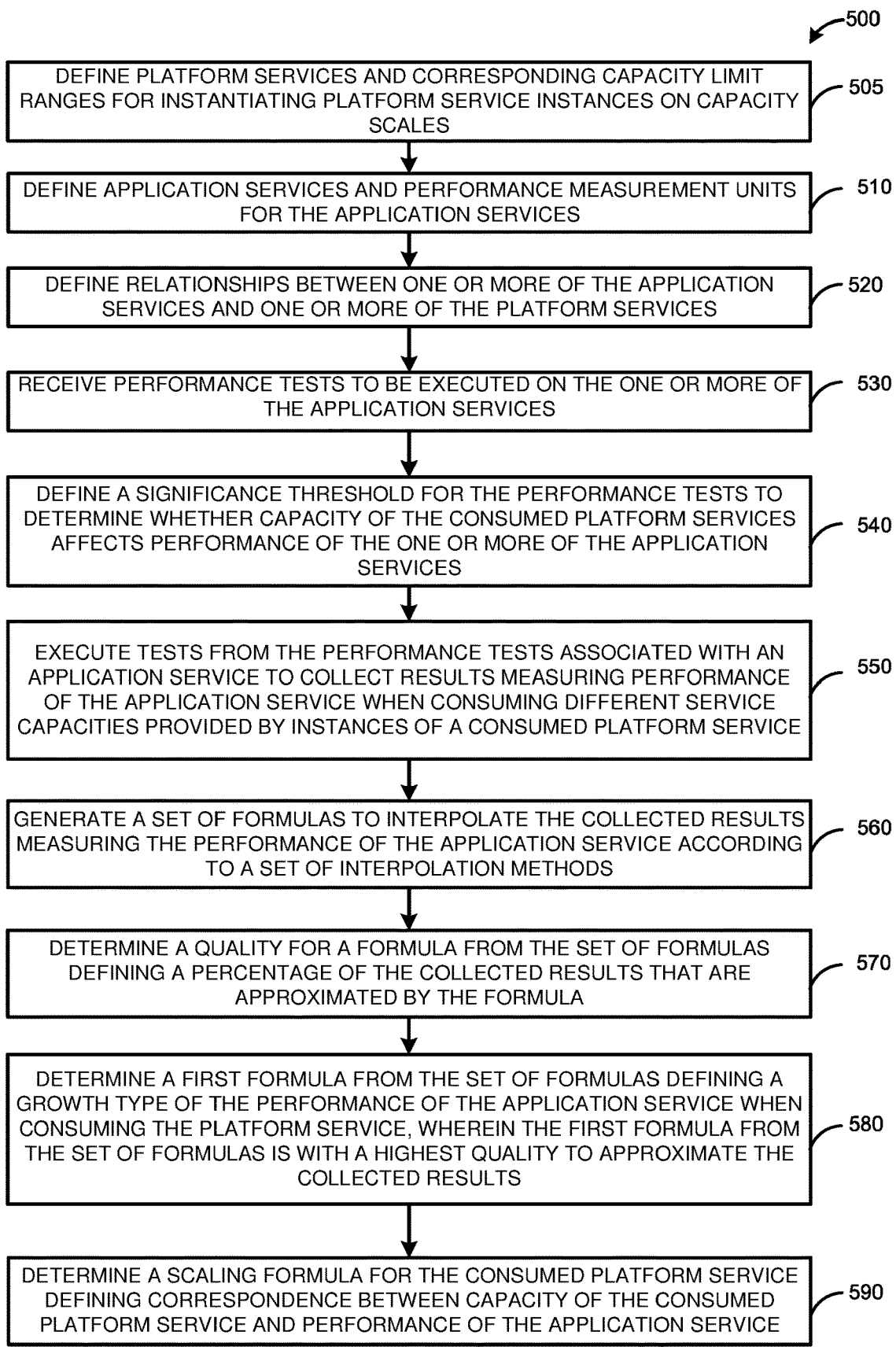
FIG. 5 is a flow diagram illustrating a process for determining a scaling formula for a platform service defining correspondence between a capacity of the platform service and performance of an application service, according to one embodiment.

FIG. 5 is a flow diagram illustrating a process 500 for determining a scaling formula for a platform service defining correspondence between a capacity of the platform service and performance of an application service, according to one embodiment. At 505, 510, 520, 530, 540 a test input is defined, such as the test input defined for running performance tests on one or more application services consuming one or more platform services defined at 410, FIG. 4. At 505, platform services are defined together with corresponding capacity limit ranges for instantiating platform service instances on capacity scales. Table 1 and Table 2 include examples of descriptions of platform services that are provided for consumption by application services on a cloud platform. The cloud platform may be such as the cloud platform 305, FIG. 3. Table 1 presents platform services that are defined on a linear scale. The presented platform services have a defined measurement unit for the linear scale. The linear scale has a capacity limit range that defines a minimum capacity and a maximum capacity, together with an incremental step for determining next steps on the linear scale. Table 2 presents a platform service "Document service", which is defined on a stepped scale. The "Document service" has a defined measurement unit GB, for the stepped scale. The stepped scale has a minimum size (128 GB) and a maximum size (2048 GB), together with a number of intermediate steps within the capacity scale limits. The stepped scale for the "Document service" defines steps 128 GB, 256 GB, 512 GB, 1024 Gb, and 2048 G B. Table 2 presents a platform service "Outgoing email server", which is defined on a stepped scale, within a capacity range between 1 and 3 email servers.

At 510, the application services are defined together with performance measurement units. Table 3 presents a set of exemplary application services that may be defined together with key performance indicators (KPIs) defined for the application services, and corresponding performance measurement units. The performance measurement units may be used when determining performance of an application service while consuming different capacities provided by a platform service provisioned on the cloud platform.

TABLE 3

| | Application service name | Application service's KPI | Performance measurement unit |
|---|---|---|---|
| 1 | Checkout purchases with smartphone and get email receipt | transactions per hour | transactions/h |
| 2 | Offer discounts via push message on smartphone | messages per hour | messages/h |
| 3 | Browse special offers with smartphone | clients browsing in parallel | number of users |

At 520, relationships between one or more of the application services and one or more of the platform services are defined. The relationships are defined when an application service consumes a platform service. One application service may consume more than one platform services, and a platform service may be consumed by more than one application services. The relationships may be defined as in Table 4 for platform services and application services defined in Table 1, Table 2, and Table 3.

TABLE 1

| | | | | Scaling of services | | |
|---|---|---|---|---|---|---|
| | | | | Linear scaling | | |
| N | Service name | Measurement unit | Scaling mode | Min (Smin) | Increment (Sinc) | Max (Smax) |
| 1 | Runtime resources - type Lite (1 CPU, 2 GB RAM) | Number of JVMs | Linear scaling | 1 | 1 | 50 |
| 2 | Runtime resources - type Professional (2 CPU, 4 GB RAM) | Number of JVMs | Linear scaling | 1 | 1 | 50 |

TABLE 2

| | | | | Scaling of services | | | | | |
|---|---|---|---|---|---|---|---|---|---|
| | Service | Measurement | Scaling | Stepped scaling | | | | | |
| N | name | unit | mode | Min | Next 1 | Next 2 | Next 3 | Next 4 | 5 | 6 |
| 3 | Outgoing email servers | Number of mail servers | Stepped scaling | 1 | 2 | 3 | | | | |
| 4 | Document service | GB | Stepped scaling | 128 | 256 | 512 | 1024 | 2048 | | |

TABLE 4

Performance test input: Relation between the
application services and the platform service

| Application service name | Platform service name |
|---|---|
| Checkout purchases with smartphone and get email receipt (application service 1) | Runtime resources - type Lite (1 CPU, 2GB RAM) (platform service 1) |
| Checkout purchases with smartphone and get email receipt (application service 1) | Outgoing email servers (platform service 3) |
| Offer discounts via push message on smartphone (application service 2) | Runtime resources - type Lite (1 CPU, 2GB RAM) (platform service 1) |
| Browse special offers with smartphone (application service 3) | Runtime resources - type Lite (1 CPU, 2GB RAM) (platform service 1) |

At 530, performance tests are received for execution on the one or more of the application services. Through running the performance test on the one or more of the application services, load handled by consumed platform services may be determined. For example, tests associated with application service 1 from Table 3—"Checkout purchases with smartphone and get email receipt", may be received. The application service 1 consumes two platform services—the first and the third of the platform services defined in Table 2—"Runtime resources—type Lite" and "Outgoing email servers". The tests associated with application service 1 may test performance of the application service in an overload situation when a large number of requests to checkout purchases with a smartphone are performed with the functionality provided by that application service 1. To provide checkout services, the application service 1 consumes "Runtime resources—type Lite" service, which is an infrastructure runtime service that provides runtime resources on a VM with 1 CPU, 2 GB RAM. The application service 1 also consumes resources provided by a number of email servers that are provided by the "Outgoing email servers" platform service. The performance of the application service 1 is measured in the performance measurement units, defined in column three of Table 3—"transactions/hour".

At 540, a significance threshold for the performance test is defined to determine whether a capacity of the consumed platform services affects performance of the one or more of the application services. At 550, tests from the performance tests that are associated with an application service are executed. The application service consumes platform services, such as the exemplary platform services from Table 1 and Table 2. The tests are executed to collect results measuring performance of the application service when consuming different service capacities provided by instances of a consumed platform service. At 560, a set of formulas associated with the application service is determined. The set of formulas interpolate the collected results, measuring the performance of the application service. The interpolation may be performed according to a set of interpolation methods. For example, the set of interpolation methods may include linear interpolation, logarithmic interpolation, exponential interpolation, etc.

In one embodiment, an interpolation formula may be associated with a type of the interpolation method. A regression analysis may be performed over the collected results to determine coefficients of determination of the different interpolation formulas. The regression analysis may apply a least squares method as a standard approach in regression analysis to approximate the solution of an over-determined system of data points, defined from the collected results. For a number of capacities provided by the consumed platform service, different performances of the application service are measures. The performances are measured in the corresponding measurement unit, e.g. transactions per hour. The data points that are part of the collected results, comprise a given capacity and a corresponding performance. The set of data points from the collected results are approximated to one or more interpolation formulas. For example, when a linear interpolation method is applied, then the collected results are approximated according to a curve fitting method that approximates the result to a curve defined by a linear function, for example formula (4):

$$Y = m \times X + b, \qquad (4)$$

where Y is the performance of the application service and X is the capacity provided by a consumed platform service.

If the employed interpolation method is logarithmic interpolation, then the logarithmic function that may approximate the collected results may be formula (5):

$$Y = \log_m \frac{X}{b}, \qquad (5)$$

where Y is the performance of the application service and X is the capacity provided by a consumed platform service.

In another example, an exponential interpolation method is applied, and the collected results are approximated to an exponential function in form of formula (6):

$$Y = b \times m^X. \qquad (6)$$

A number of interpolation methods may be applied and at 570, a quality for a formula from the set of formulas may be determined. The quality of a formula may be defined in form of a percentage value that define how much of the collected results are approximated by the formula. A quality of a formula defines how exact is the interpolation of the collected results. Table 5 presents results collected from performance tests run on an application service "Checkout purchases with smartphone and get email receipt" (application service 1, Table 3) consuming platform service "Runtime resources—type Lite (1 CPU, 2 GB RAM)" (platform service 1), as defined in Table 4. The results from Table 5 define data points (9000, 1), (12000, 2), (14000, 3), which may be approximated to a fitting curve under a number of interpolation methods. For example, if three interpolation methods are applied—linear, logarithmic, and exponential, different three formulas may be defined.

TABLE 5

| | | Performance tests | | |
|---|---|---|---|---|
| Performance test | Measurement unit | Performance test 1 | Performance test 2 | Performance test 3 |
| Checkout purchases with smartphone and get email receipt | transactions/ hour | 9000 | 12000 | 14000 |
| Runtime resources (1 CPU, 2GB RAM) | # JVM's | 1 | 2 | 3 |

TABLE 6

| Quality of interpolation formula | | | Initial growth of application performance | | Application performance growth type | |
|---|---|---|---|---|---|---|
| Linear | Logarithmic | Exponential | Insignificant | Performance significance rate | type name | Name |
| 98.7% | 99.9% | 97.0% | FALSE | 33% | Log | $Y = \log_m \frac{X}{b}$ |

A performance significance rate may be computed for the relationship between the application service and the platform service. The performance significance rate may be computed according to the formula for the performance rate (2). The performance significance rate may be compared with a significance threshold to determine whether the capacity provided by the platform service 1 is significant or not insignificant to the performance of the application service 1. Qualities of the interpolation formulas may be determined and are presented on Table 6.

At 580, a first formula from the set of formulas is determined, which is with a highest quality to approximate the collected results compared to the quality of the rest of the formulas from the set. The first formula defines a growth type of the performance of the application service 1, when consuming the platform service 1. In the example of Table 6, the formula with the highest quality is the logarithmic formula (7):

$$Y = \log_m \frac{X}{b}, \quad (7)$$

which defines that the performance of the application service 1 grows logarithmically when consuming higher capacity of the consumed platform service 1.

Table 7 presents the exact logarithmic formula that interpolates the collected results as presented on Table 5—m equals 1.00022064, b equals 0.027561263.

TABLE 7

| Performance interpolation formula | | | |
|---|---|---|---|
| Name | Parameter m | Parameter b | std. err. Y estimate |
| $Y = \log_m \frac{X}{b}$ | 1.000220641 | 0.138538375 | 0.027561263 |
| | Std err. m: 7.74405E-06 | Std err. b: 0.09173781 | |

In one embodiment, for an interpolation formula, a standard error for the estimation of Y (the performance of the application service) is determines. Also, standard errors for the determination of the coefficients "m" and "b" are also determined Based on an interpolation formula determined at 570, maximum performance ranges for the application service when consuming the different capacities of the first platform service may be defined. The ranges are defined based on the determined standard error for the coefficients and for the estimation of the performance. The ranges have a lower and an upper bound. The lower bound of a range may be defined as a lowest possible performance of the application service when consuming a corresponding capacity provided at a lowest point on the capacity scale of the consumed platform service. The lowest possible performance of the application service is defined by applying a reduction of the estimation of the performance by the calculated standard errors for m, b, and Y. The upper bound of a range may be defined as a middle point within the minimal and maximum possible performance of the application service, when consuming the corresponding capacity provided at the lowest point and a highest point on the capacity scale. The highest possible performance of the application service is defined by increasing the estimation of the performance with the calculated standard errors for m, b, and Y. The middle point within the range may be determined as an average number within the performance range defined between the lowest and highest performance.

A first maximum performance range and a second maximum performance range are presented on Table 8. The first maximum performance range and the second maximum performance are determined for application service 1—"Checkout purchases with smartphone and get email receipt" (application service 1) when consuming platform service "Runtime resources—type Lite (1 CPU, 2 GB RAM)" (platform service 1 as defined in Table 4). The first maximum performance range may be determined for application service 1 when consuming platform service "Runtime resources—type Lite (1 CPU, 2 GB RAM)" at a lowest point on a capacity limit range for the platform service, namely on 1 VM with one JVM on top. The second maximum performance range may be determined for application service 1 when consuming platform service "Runtime resources—type Lite (1 CPU, 2 GB RAM)" at a highest point on a capacity limit range for the platform service, namely on 50 VM with 50 JVM on top. The capacity limit range for the platform service is defined in Table 1.

TABLE 8

| | | Application service KPI's | |
|---|---|---|---|
| Application service name | Measurement unit | Max performance on smallest infrastructure | Max performance on biggest infrastructure |
| Checkout purchases with smartphone and get email receipt | transactions/h | 6400-8900 | 23500-26600 |

At 590, a scaling formula for the consumed platform service is determined that defines correspondence between capacity of the consumed platform service and performance of the application service. The scaling formula may be used to determine required capacity for provisioning the consumed platform service for a desired performance for the application service. When the desired performance is provided as input to the scaling formula, a required capacity may be determined as an output. The scaling formula may be defined as a function of the desired performance. The scaling formula may be determined as an inverse function of the first formula defined for the application service consuming the platform service. The scaling formula may be interpreted as an extrapolation formula, defining a relationship between capacity provided by the consumed platform service and requested performance of the application service. Based on the scaling formula, required capacity may be computed.

For the example described in relation to application service 1—"Checkout purchases with smartphone and get email receipt" that consumes platform service "Runtime resources—type Lite (1 CPU, 2 GB RAM)" (platform service 1 as defined in Table 4), a scaling formula may be defined as an inverse function to the logarithmic interpolation formula (7)

$$\left(Y = \log_m \frac{X}{b}, \text{ where } m = 1.00022064, \text{ and } b = 0.027561263\right).$$

An inverse function to the logarithmic interpolation function (7) is an exponential function (8):

$$Y = b \times m^X \quad (8)$$

Therefore, the scaling formula for application service 1 consuming platform service 1 is defined as exponential function with the formula (8), where the exact scaling formula with the computed parameters is $Y=0.027561263 \times 1.00022064^X$. In the computed scaling formula, Y is capacity that is estimated to be provided for consumption by application service 1, and X is the input variable defined as the desired performance of the application service 1.

Figure 6A:
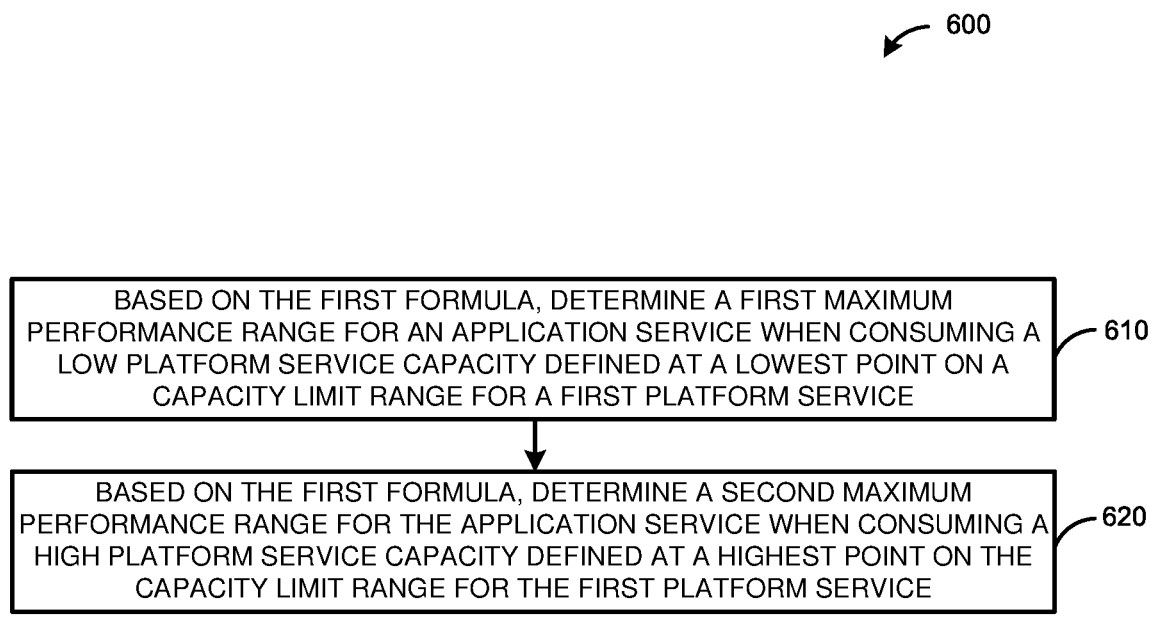
FIG. 6A is a flow diagram illustrating a process for determining maximum performance ranges for an application service when consuming different capacities of the first platform service, according to one embodiment.

FIG. 6A is a flow diagram illustrating a process 600 for determining maximum performance ranges for an application service when consuming different capacities of the first platform service, according to one embodiment. The application service and the first platform service may be as described in relation to FIG. 4 and FIG. 5. A first formula for an application service is determined, which is an interpolation formula such as the formula defined at 580, FIG. 5. At 610, based the first formula, a first maximum performance range for the application service when consuming a low platform service capacity is determined. The low platform service capacity is defined at a lowest point on a capacity limit range for the first platform service. For example, for a given platform service, such as the platform service 1 in Table 1—Runtime resources—type Lite (1 CPU, 2 GB RAM), a lowest point is 1 VM with 1 JVM running on it. At 620, based on the first formula, a second maximum performance range for the application service when consuming a high platform service capacity of the first platform service may be determined. The high platform service capacity is defined also on the capacity limit range for the first platform service. The first and the second maximum performance range may be determined in relation to a computed standard error to the coefficients in the first formula and a standard error of the estimation of the performance of the application service. The first and the second maximum performance range may be determined as described above in relation to FIG. 5 and Table 7.

Figure 6B:
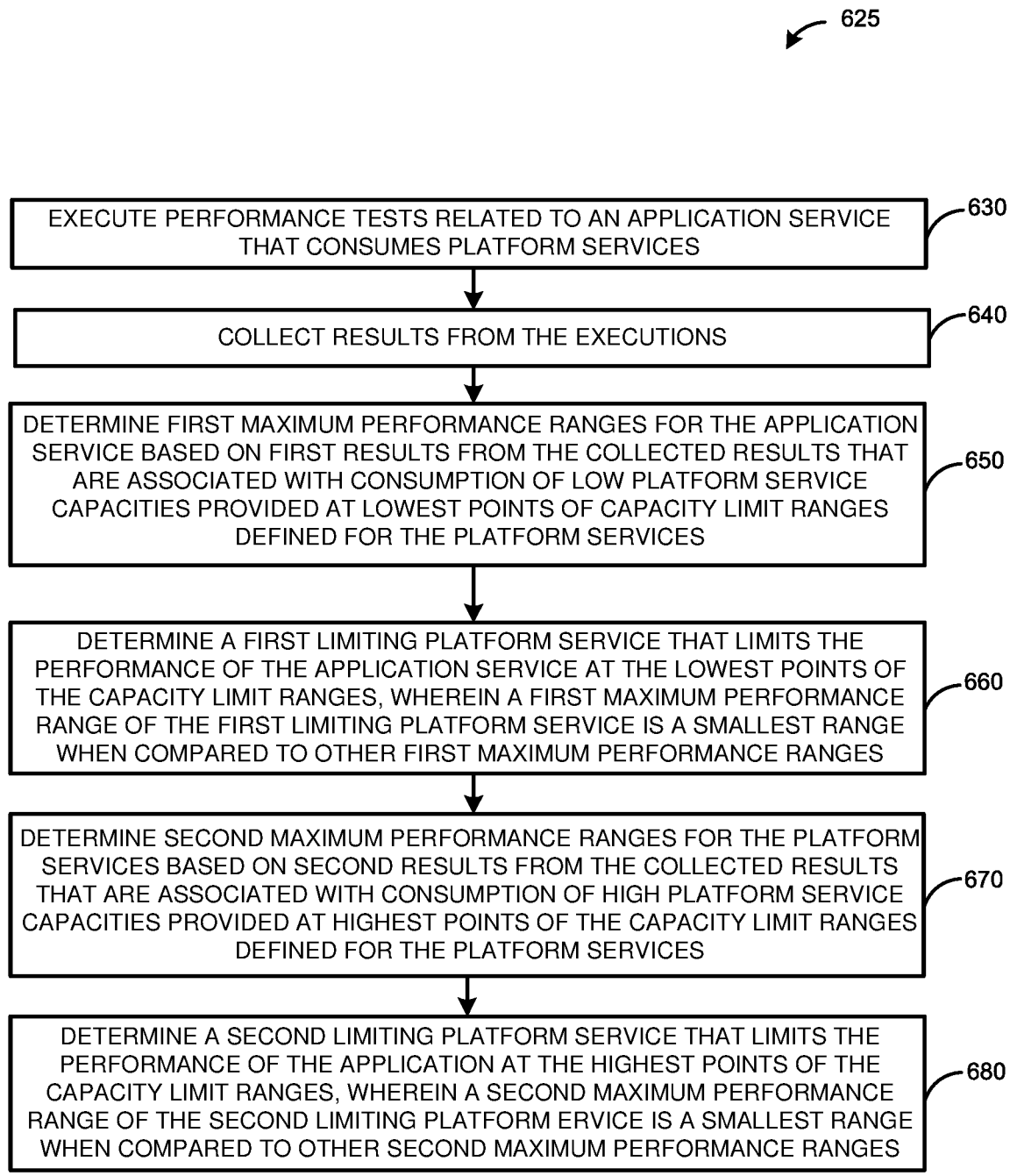
FIG. 6B is a flow diagram illustrating a process for determining limiting platform services for performance of an application service, according to one embodiment.

FIG. 6B is a flow diagram illustrating a process 625 for determining limiting platform services for performance of an application service, according to one embodiment. At 630, performance tests related to an application service are executed. The application service consumes platform services provided by a cloud platform. The application service is also provisioned on the cloud platform. At 640, results from the executions of the performance tests are collected. The results may be such as the results presented on Table 5.

At 650, first maximum performance ranges for the application service are determined. The first maximum performance ranges are determined based on first results part of the collected results at 640. The first results are associated with consumption of low platform service capacities provided at lowest points of capacity limit ranges defined for the platform service. At 660, a first limiting platform service that limits the performance of the application service at the lowest points of the capacity limit ranges is determined. The first limiting platform service is determined from the platform services that are consumed by the application service on the cloud platform. The first maximum performance range of the first limiting platform service is a smallest range when compared to other first maximum performance ranges of rest of the consumed platform services. At 670, second maximum performance ranges are determined based on second results part of the collected results at 640. The second results are associated with consumption of high platform service capacities provided at highest points of the capacity limit ranges defined for the platform services. At 680, a second limiting platform service that limits the performance of the application service at the highest points of the capacity limit ranges is determined. The second limiting platform service is determined from the platform services that are consumed by the application service on the cloud platform. The second maximum performance range of the second limiting platform service is a smallest range when compared to other second maximum performance ranges of rest of the consumed platform services. Further, a maximum allowable performance of the application service when consuming the plurality of services may be determined. The maximum allowable performance is defined as an upper bound of the second maximum performance range of the second limiting platform service.

For example, the application service may be such as the application service 1—"Checkout purchases with smartphone and get email receipt", which consumes platform service "Runtime resources—type Lite (1 CPU, 2 GB RAM)" (platform service 1) and platform service "Outgoing email servers (platform service 3), as defined in Table 1 and Table 4. Test may be executed for that application service and Table 8 present exemplary results for the performance of the application service when consuming different capacities provided by the two platform services. The results presented in Table 8 may be collected based on performance tests that are run on the application service to measure the performance of the application service with respect to provided capacities by the first platform service "Runtime resources—type Lite (1 CPU, 2 GB RAM)" and additionally with respect to provided capacities by the second platform service "Outgoing email servers.

TABLE 8

|  |  | Performance tests | | |
| --- | --- | --- | --- | --- |
| Performance test | Measurement unit | Performance test 1 | Performance test 2 | Performance test 3 |
| Checkout purchases with smartphone and get email receipt | transactions/h | 9000 | 12000 | 14000 |
| Runtime resources - type Lite (1 CPU, 2GB RAM) | # JVM's | 1 | 2 | 3 |
| Checkout purchases with smartphone and get email receipt | transactions/h | 10000 | 16000 | 20000 |
| Outgoing email servers | # mail server | 1 | 2 | 3 |

A first part of the results from Table 8 is regarding test run on the application service while consuming resources provided by the "Runtime resources" platform service. Three different capacities are consumed and the performance is measured in the three consumption cases providing different number of runtime resources for hosting the application service—when there is 1 VM with 1 JVM 2 VMs with 2 JVMs, and 3 VMs with 3 JVMs. A second part of the results from Table 8 is regarding test run on the application service while consuming resources provided by the "Outgoing email servers" platform service. Three different capacities are consumed and the performance is measured in the three consumption cases—when the application services consumes—1 mail server, 2 mail servers, and 3 mail servers. Based on the collected results, two interpolation formulas for the application service "Checkout purchases with smartphone and get email receipts" in relation to the consumed first platform service ("Runtime resources—type Lite") and the second platform service ("Outgoing email servers") may be determined. The two interpolation formulas may be such as the first formula determined at step 580, FIG. 5. The growth type of the application service with respect to both platform services may be determined. The growth type corresponds to the type of the interpolation formula that is determined. The determined interpolation formula type, together with the expression of the formula, the computed parameters, and the standard error determined for the parameters m, b, and the standard error for the estimation of the performance of the application service are presented on Table 9.

TABLE 9

| Application performance growth type | | | Performance interpolation formula | | |
|---|---|---|---|---|---|
| Platform service | type name | Interpolation formula | Parameter m | Parameter b | std. err. Y estimate |
| Runtime resources - type Lite | Logarithmic | $Y = \log\{m\} (X/b)$ | 1.000220641 | 0.138538375 | 0.027561263 |
| | | | 7.74405E−06 | 0.09173781 | |
| Outgoing mail server | Logarithmic | $Y = \log\{m\} (X/b)$ | 1.000110314 | 0.334827012 | 0.027561263 |
| | | | 3.87202E−06 | 0.061466463 | |

Based on the generated interpolation formulas, two first maximum performance ranges for the application service may be determined. The two first maximum performance ranges for the application service may be defined at the low platform service capacities provided by the platform services. For the first platform service the lowest point of the capacity limit range is 1 VM with 1 JVM, and for the second platform service the lowest point of the capacity limit range is 1 outgoing mail server. Based on the generated interpolation formulas, two second maximum performance ranges for the application service may be determined. The two second maximum performance ranges for the application service may be defined at the high platform service capacities provided by the platform services. For the first platform service the highest point of the capacity limit range is 50 VM with 50 JVM, and for the second platform service the highest point of the capacity limit range is 4 outgoing mail servers. The capacity limit ranges are defined at Table 1. Table 10 presents the determined first and second maximum performance ranges.

TABLE 10

| Application service name | Measurement unit | Max performance on low platform service capacity | Max performance on high platform service capacity | Platform service name |
|---|---|---|---|---|
| Checkout purchases with smartphone and get email receipt | transactions/h | 6400-8900 | 23500-26600 | Runtime resources - type Lite (1 CPU, 2GB RAM) |
| Checkout purchases with smartphone and get email receipt | transactions/h | 8100-9900 | 20200-22400 | Outgoing email servers |

The maximum performance ranges on low platform service capacities and on high platform services capacities are computed based on the determined standard error for the coefficients and for the estimation of the performance as presented in Table 9. The ranges have a lower and an upper bound. The lower bound of a range may be defined as a lowest possible performance of the application service when consuming the corresponding capacity provided by a consumed platform service. The upper bound of a range may be defined as a middle point within the minimal and maximum possible performance of the application service when consuming the corresponding capacity provided by a consumed platform service. The middle point is defined as an average performance between the highest point in performance and the lowest point in performance. In the example regarding application service 1—"Checkout purchases with smartphone and get email receipt", a first limiting platform service at the lowest points of the capacity limit ranges is the first consumed platform service—"Runtime resources—type Lite". The first consumed platform service—"Runtime resources—type Lite" is determined as the first limiting service as the range 6400 to 8900 is the smallest range, when compared with 8100 to 9900. A second limiting platform service for the application service 1—"Checkout purchases with smartphone and get email receipt" at the high platform service capacities is the second platform service—Outgoing email servers. The second consumed platform service—"Outgoing email servers" is determined as the second limiting service as the range 20200 to 22400 is the smallest range, when compared with 23500 to 26600.

Figure 7:
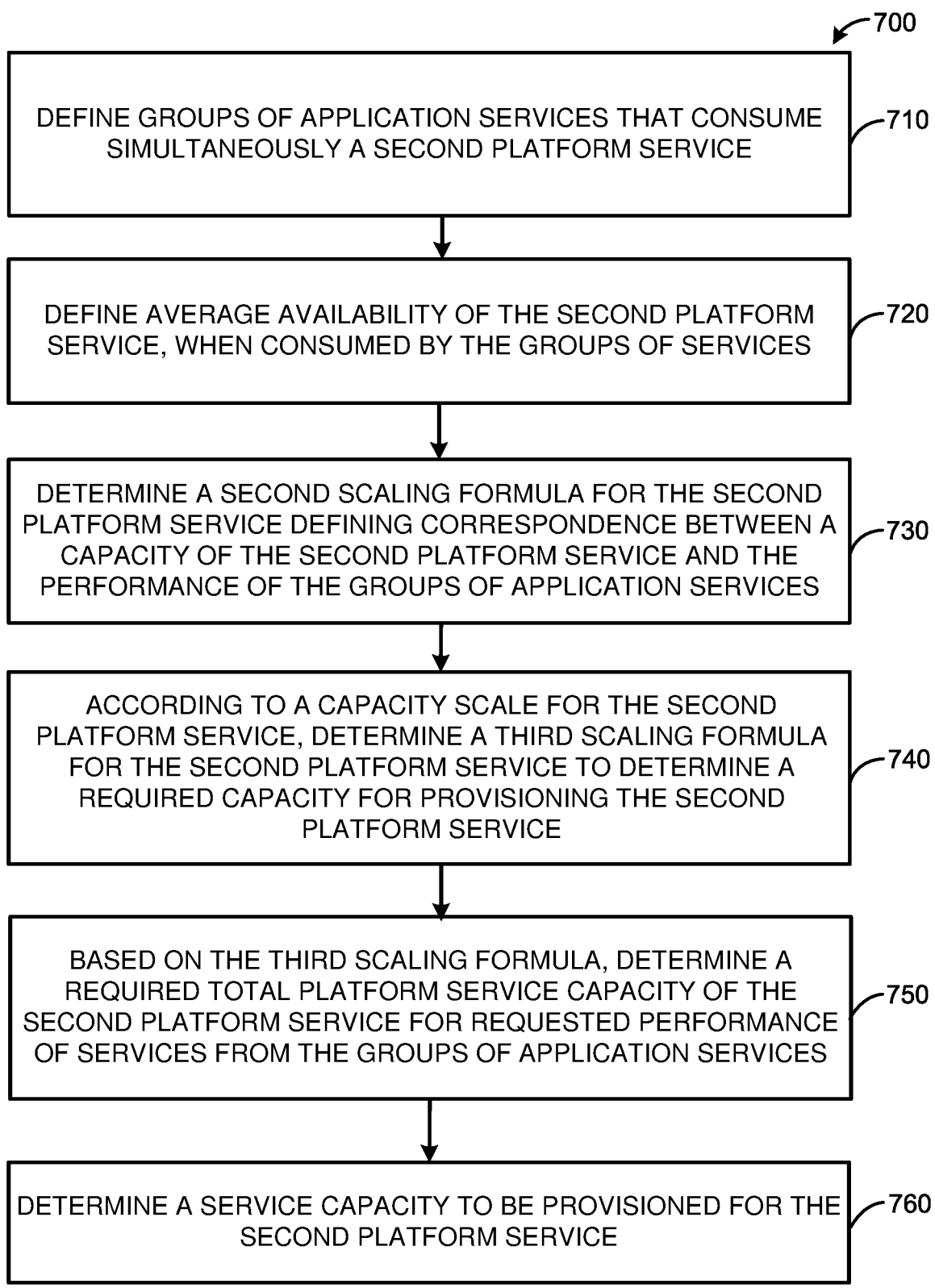
FIG. 7 is a flow diagram illustrating a process for determining a service capacity to be provisioned for a platform service that is consumed by groups of application services, according to one embodiment.

FIG. 7 is a flow diagram illustrating a process 700 for determining a service capacity to be provisioned for a platform service that is consumed by groups of application services, according to one embodiment. At 710, groups of application services are defined. The groups consume simultaneously a second platform service. At 720, average availability of the second platform service is defined. The average availability is defined for consumption by the group of application service. The availability may be defined as a percentage of capacity provided by the platform service, for example 90%. At 730, a second scaling formula for the second platform service is determined. The second scaling formula defines correspondence between a capacity of the second platform service and performance of the application service from the groups. The second scaling formula defines correspondence between a capacity of the second platform service and performance of the group of application services. At 740, according to a capacity scale defined for the second platform service, a third scaling formula for the second platform service is determined. The third scaling formula determines a required capacity for provisioning the second platform service with respect to required performance of the application services that are part of the groups and also with respect to the defined average availability.

At 750, based on the third scaling formula, a required total platform service capacity of the second platform service for requested performance of application services from the groups is determined. At 760, a service capacity to be provisioned for the second platform service is determined. The service capacity for provisioning may be defined according to a capacity scale and capacity limit range of the second platform service. The provisionable capacity for the second platform service may be determined for a requested performance of the application services based on the third scaling formula. The provisionable capacity may be defined as a discrete value on the scale of measurement units for a platform service that may be provided. A whole VM may be provided, and if half of a VM is required for a requested performance, then the provisionable capacity would be determined to be 1 VM. In another example, the scale of the measurement units for a platform service is limited, and then 51 VMs are requested and 50 VMs is the highest point on the scale, then 50 VMs is the provisionable capacity.

TABLE 11

| Platform service name | Availability for relevant application services | Relevant application services | | |
|---|---|---|---|---|
| | | Checkout purchases with smartphone and get email receipt (X1) | Offer discounts via push message on smartphone (X3) | Browse special offers with smartphone (X4) |
| Runtime resources - type Lite (1 CPU, 2GB RAM) | 90% | Group 1 | Group 2 | Group 1 |
| Outgoing email servers | 90% | Group 1 | | |

Table 11 presents a definition of groups of application services. The application services in table 11 are part of the services presented at Table 3. The first platform service from Table 11 is the platform service "Runtime resources—type Lite" from Table 1 and the second platform service from Table 11 is the "Outgoing email servers" platform service from Table 1. The relations between application services and platform services are as defined in Table 4. Tests over the application services are executed to measure performance in different cases providing different capacities from the platform services. Groups are defined to include application services that simultaneously consume a platform service. Group 1 includes application services "Checkout purchases with smartphone and get email receipt" and "Browse special offers with smartphone". They may be denoted as correspondingly X1 and X3. Group 2 include one application service—"Offer discounts via push messages on smartphone", which may be denoted as X3. The platform services from Table 11 are defined with an associated availability for consumption by relevant application service. Further, the platform services are associated with relevant application services, which relevant application services are spread into two different groups of application services. The two groups define relevant application services that consume simultaneously a corresponding platform service from the platform services.

TABLE 12

| X1 from G1 | X3 from G2 | X4 from G1 |
|---|---|---|
| $Y1 = b * m^{X1}$ | $Y3 = (X3 - b)/m$ | $Y4 = \log\{m\}(X4/b)$ |
| $Y1max = (b + ^-b)$ $* (m + ^-m)^{X1}$ | $Y3max = (X3 -$ $b + ^-b)/(m - ^-m)$ | $Y4max = \log\{m - ^-m\}$ $(X4/(b - ^-b))$ |
| $m = 1.00022064$ | $m = 10000$ | $m = 1.6507574$ |
| $b = 0.138538375$ | $b = 0$ | $b = 2470.74734$ |
| $^-m = 0.000007744$ | $^-m = 0$ | $^-m = 0.033706617$ |
| $^-b = 0.09173781$ | $^-b = 0$ | $^-b = 0.072814616$ |

Table 12 presents the scaling formulas that are defined for the consumed platform service—"Runtime resources—type Lite", for each of the application services that is part of the defined groups. The scaling formulas for the platform service in relation to the corresponding application services are determined as inverse formulas to determined interpolation formulas for the application services. The interpolation formulas and the scaling formulas respectfully, are determined based on results collected from performance test executions measuring performances of the application services when consuming different platform service capacities. The interpolation formulas are determined as described above, for example in relation to Table 9 and to application service 1 (here denoted as X1)—"Checkout purchases with smartphone and get email receipt". For an application service the interpolation formula is defined as a function Y of an input X parameter, where X is the provided capacity from the consumed platform service. The output Y from the interpolation formula defines the performance of the application service for the provided capacity for consumption by the respected platform service. The scaling formulas are determined as inverse functions of the interpolation formulas, as described in relation to FIG. 5. The scaling formulas are defined as a function Y of an input parameter X, where Y is capacity provided by consumed platform service and X is a variable defining a required performance of the respectful application service that consumed the platform service. For every relation of consumption between an application service and a platform service, a scaling formula for the platform service may be defined. The scaling formula is defined as an inverse function of the interpolation formula for the application service when consuming a capacity of resource from the platform service.

In one embodiment, based on the determined 3 scaling formulas for platform service "Runtime resources—type Lite" in relation to application service X1, X3, and X4, a demanded platform service capacity may be determined according to a third scaling formula, such as the formula determined at 740, FIG. 7. The third scaling formula may depend on the type of a scaling mode of the demanded platform service.

Table 13 presents how the demand for capacity provided by the platform service "Runtime resources—type Lite" may be computed based on a third scaling formula, where the platform service "Runtime resources—type Lite" is defined with a linear scaling mode. The third scaling formula for the demand for the platform service "Runtime resources—type Lite" is denoted with D and is defined as a maximum demanded capacity by a group from the defined groups, divided by the average availability defined for the platform service—D=Max (G1; . . . ; Gm)/a. In the current example G1 up to Gm are the set of two groups that are defined—Group 1 and Group 2 from Table 11. G1 is defined as an individual demand for consuming capacity provided by the platform service "Runtime resources—type Lite" by the application services part of Group 1. In a similar manner, Gm is defined as an individual demand for capacity to be provided by the platform service "Runtime resources—type Lite" for consumption by the application services that are part of Group M, as Group M is the last one of the groups defined. In the current example M equals 2. Therefore, the third scaling formula D (demand for capacity provided by the platform service "Runtime resources—type Lite") defined that required capacity for provisioning the platform service "Runtime resources—type Lite" equals Max (G1; G2) divided by the defined average availability "a" of the platform service, where G1=Y1+Y4, G2=Y3, and a (the average availability)=equals 0.9. Y1 is the demanded capacity from the platform service "Runtime resources—type Lite", when consumed by application service—X1, Y3 is the demanded capacity from the platform service "Runtime resources—type Lite", when consumed by application service—X3, Y4 is the demanded capacity from the platform service "Runtime resources—type Lite", when consumed by application service—X4. Through determining the formula D for calculating platform service capacity demand, a required total platform service capacity of the platform service for requested performance of application services from the groups may be determined.

TABLE 13

| Platform service name | P = Provisionable capacity for platform services with linear scaling | D = Calculated platform service capacity demand |
| --- | --- | --- |
| Runtime resources -type Lite (1 CPU, 2GB RAM) (measured in a number of VMs with running JVMs) | if (D > Smax) {P = Smax} elseif (D < Smin) {P = Smin} else {P = Smin + Sinc * Round((D − Smin)/Sinc)} Smin = 1 Sinc = 1 Smax = 50 | D = MAX (G1; . . . ; Gm)/a G1 = Y1 + Y3 G2 = Y2 a = 0.9 |

The second column of Table 13 presents a method for computing platform service capacity to be provisioned for a platform service consumed by groups of application services. In the current example, the platform service is the platform service "Runtime resources—type Lite". The determination of the provisionable platform service capacity, denoted by P, is based on the determined demand for service capacity D and is associated with the capacity limit ranges defined for the platform service. The platform service "Runtime resources—type Lite" provides for consumption a minimum of 1 VM with 1 JVM, up to 50 VMs with 50 JVMs running, where an incremental step defined for the capacity scale is 1 VM with 1 JVM.

When the demand for capacity provided by the platform service "Runtime resources—type Lite", D, is greater than the highest possible capacity to be provided by the platform service "Runtime resources—type Lite", then the provisioned capacity is the maximum capacity (Smax) as defined on the capacity scale of the platform service. When the demand for capacity provided by the platform service "Runtime resources—type Lite", D, is lower than the lowest possible capacity to be provided by the platform service "Runtime resources—type Lite", then the provisioned capacity is the minimum capacity (Smin) as defined on the capacity scale of the platform service. When the demand for capacity provided by the platform service "Runtime resources—type Lite", D, is between the minimum and maximum capacity defined on the capacity scale, then the provisionable capacity P is determined according to the following formula (9):

$$P = S_{min} + S_{inc} \times \text{Round}\left(\frac{D - S_{min}}{S_{inc}}\right), \quad (9)$$

where Smin is the minimum capacity that may be provisioned for the platform service, Sinc is the incremental capacity that may be provisioned, and the function Round ( ) is a function which returns the result number of the expression $$\frac{D - S_{min}}{S_{inc}},$$

rounded up, away from zero, to the nearest integer.

Table 14 presents how the demand for capacity provided by the platform service "Outgoing email server" may be computed based on defining a third scaling formula for the platform service "Outgoing email server". The platform service "Outgoing email server" is defined with a stepped scaling mode. The third scaling formula for the demand for the platform service "Outgoing email server" is denoted with D and is defined as a maximum demanded capacity by a group from the defined groups, divided by the average availability defined for the platform service—D=Max (G1; . . . ; Gm)/a. In the current example in Table 14, group 1 is the only group from the defined groups that includes an application service (defined in Table 11, application service "Checkout purchases with smartphone and get email receipt), which consumes the platform service "Outgoing email server".

The defined average availability for the platform service "Outgoing email server" is 0.9, or if presented as a percentage value—90%. G1 in Table 14 is defined as an individual demand for consuming capacity provided by the platform service "Outgoing email server" by the application services part of Group 1, namely application service "Checkout purchases with smartphone and get email receipt". The second column of Table 14—"P=Provisionable capacity for platform services with stepped scaling", presents a method for computing platform service capacity to be provisioned for a platform service consumed by groups of application services, when the platform service is defined on a stepped capacity scale. In the current example, the platform service is the platform service "Outgoing email servers". The determination of the provisionable platform service capacity, denoted by P, is based on the determined demand for service capacity D and is associated with the capacity limit ranges defined for the platform service "Outgoing email servers".

TABLE 14

| Platform service name | P = Provisionable capacity for platform services with stepped scaling | D = calculated platform service capacity demand | Scaling formula |
|---|---|---|---|
| Outgoing email servers | if (D > Smax) {P = Smax} else {P = Match(D, [Smin; Snext; . . . ; Smax])}} Smax = 3 [Smin; Snext; . . . ; Smax] = [1; 2; 3] | D = MAXa (G1; . . . ; Gm)/G1 = Y1 a = 0.9 | Y1 = b * m^X1 Y1max = (b + ⁻b) * (m + ⁻m)^X1 m = 1.00011031 b = 0.334827012 ⁻m = 0.000003872 ⁻b = 0.061466463 |

The platform service "Outgoing email server" provides mail servers for consumption. When the demand for capacity provided by the platform service "Outgoing email servers", D, is greater than the highest possible capacity (Smax=3) to be provided as defined on the capacity scale of the platform service, then the provisioned capacity is the maximum capacity (Smax) as defined on the capacity scale of the platform service. When the demand for capacity provided by the platform service "Outgoing email servers", D, is not greater than the highest possible capacity (Smax=3) to be provided by the platform service "Outgoing email servers", then the provisioned capacity P is computed based on a matching function (10):

$$P=\text{match}(D,[\text{array-of-provisionable-capacities}]), \quad (10)$$

where D is the determined desired demand, and for a given computed demand D, the match function looks up into an array of provisionable capacities defined in the [array-of-provisionable-capacities]. The matching function determines a provisionable capacity (S) from the array that is greater then the demand D, where S is the smallest possible value in the array [Smin, Snext, . . . , Smax]. The array ([array-of-provisionable-capacities]) defines a list of capacities defined on the stepped scale of the platform service "Outgoing mail servers". The list of capacities defined in the array starts with the smallest capacity—Smin, followed by zero or more higher capacities S next, which are defined in an increasing order. The list ends with the maximum capacity Smax as defined for the platform service "Outgoing mail servers". In the current example of the platform service "Outgoing mail servers", the array is defined as follows: [1 server, 2 servers, 3 servers].

The determination of provisionable capacities for platform services may be utilized when defining business key performance indicators for application services when consuming limited resource provided by the platform services. The described method for determining provisionable capacities per platform service may be used for the automation of provisioning of computer systems providing the platform services. The provisionable capacities are determined in relation to considering a highest load handled by the platform services when consuming groups of application services and considering scaling models and capacity limit ranges of the platform services.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
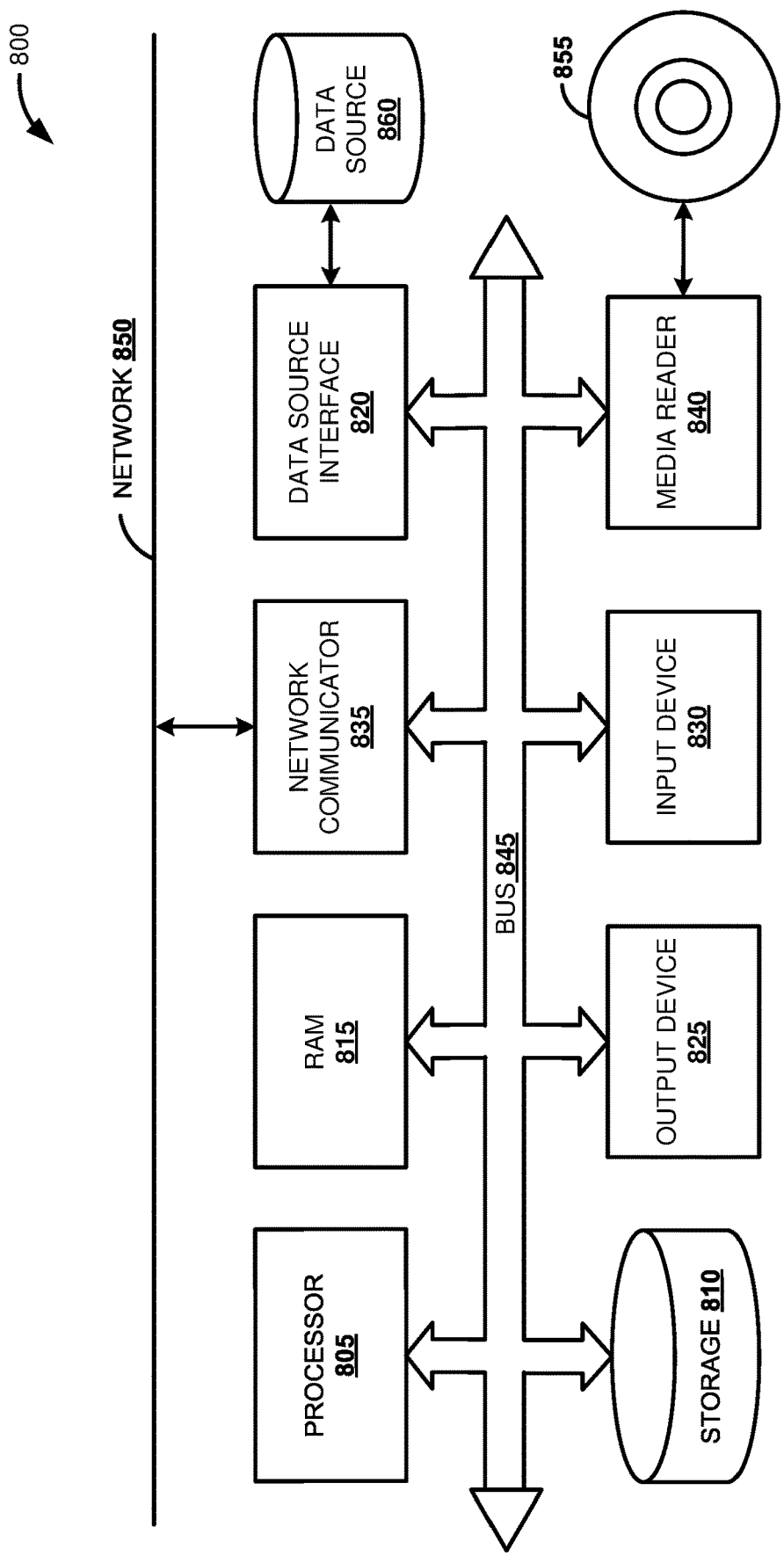
FIG. 8 is a block diagram illustrating an embodiment of a computing environment in which the techniques described for determining a required service capacity of a platform service consumed by an application service can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system X00 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method, the method comprising:
    executing a performance test on an application service while the application service is consuming a first testing service capacity provided through a set of first instances of a first platform service and while the application service is consuming a second testing service capacity provided through a second set of instances of the first platform service, wherein the first testing service capacity is different from the second testing service capacity;
    measuring, during the execution of the performance test, a first performance of the application service while consuming the first testing service capacity of the first platform service and a second performance of the application service while consuming the second testing service capacity of the first platform service;
    generating a set of formulas for the application service to interpolate the first performance and the second performance of the application service during the execution of the performance test according to a set of interpolation methods;
    determining a first formula from the set of formulas, the first formula defining a growth type for the first performance and second performance of the application service when consuming the first platform service, wherein the first formula is with a highest quality to approximate the first performance and the second performance of the application service;
    determining a scaling formula for the first platform service as an inverse formula of the first formula, the scaling formula defining a correspondence between a performance of the application service and a first service capacity of the first platform service provided for consumption by the application service, wherein the scaling formula is for calculating a first service capacity demand of the first platform service;
    based on the generated set of formulas for the application service, determining maximum performance ranges for the application service while consuming the first testing service capacity of the first platform service and the second testing service capacity of the first platform service through interpolating the first performance and the second performance, wherein determining the maximum performance ranges for the application service further comprises, based on the first formula:
        determining a first maximum performance range for the application service while consuming a low platform service capacity defined at a lowest point on a capacity limit range for the first platform service; and
        determining a second maximum performance range for the application service while consuming a high platform service capacity defined at a highest point on the capacity limit range for the first platform service;
    based on the scaling formula, determining a required capacity of the first platform service for a predefined performance of the application service by calculating the required capacity with the predefined performance of the application service as an input to the scaling formula; and
    provisioning the first platform service with the required capacity of the first platform service.

2. The method of claim 1, wherein the generation of the set of formulas for the application service to interpolate first performance and the second performance of the application service further comprises:
determining a quality for a formula from the set of formulas, wherein the quality defines how exact is the interpolation of the first performance and the second performance.

3. The method of claim 1,
wherein the first and the second maximum performance ranges are defined in a performance measurement unit of the application service.

4. The method of claim 3, wherein the first maximum performance range and the second maximum performance range are determined in relation to a standard error of a performance estimation of the application service and a standard error for a parameter defined within the scaling formula.

5. The method of claim 1, wherein the first performance and the second performance are measured in a performance measurement unit defined for the application service.

6. The method of claim 1, wherein the application service consumes a plurality of instances of consumed platform services that are provisioned and provided for consumption by the application service in a plurality of capacities defined on capacity scales corresponding to the consumed platform services.

7. The method of claim 1, further comprising defining test input for the execution of the performance test on the application service, wherein defining the test input comprises:
defining platform services and corresponding capacity limit ranges for instantiating platform service instances on capacity scales;
defining the application service and performance measurement units for the application service;
defining relationships between the application service and one or more of the platform services;
receiving the performance test; and
defining a significance threshold for the performance test to determine whether a capacity of the consumed platform services affects performance of the application service.

8. The method of claim 7, further comprising:
defining groups of application services that consume simultaneously a second platform service from the one or more of the platform services;
defining average availability of the second platform service for the groups of application services;
determining a second scaling formula for the second platform service, the second scaling formula defining correspondence between a capacity of the second platform service and performance of the groups of application services; and
according to a capacity scale for the second platform service, determining a third scaling formula for the second platform service to determine a required capacity for provisioning the second platform service.

9. The method of claim 8, further comprising:
based on the third scaling formula, determining a required total platform service capacity of the second platform service for requested performances of services from the groups of application services; and
based on the determined required total platform service capacity and a capacity limit range of the second platform service, determining a second service capacity to be provisioned for the second platform service.

10. A computer system comprising:
a processor;
a memory in association with the processor storing instructions related to:
execute a performance test on an application service while the application service is consuming a first testing service capacity provided through a set of first instances of a first platform service and while the application service is consuming a second testing service capacity provided through a second set of instances of the first platform service, wherein the first testing service capacity is different from the second testing service capacity;
measure, during the execution of the performance test, a first performance of the application service while consuming the first testing service capacity of the first platform service and a second performance of the application service while consuming the second testing service capacity of the first platform service;
generate a set of formulas for the application service to interpolate the first performance and the second performance of the application service during the execution of the performance test according to a set of interpolation methods;
determine a first formula from the set of formulas, the first formula defining a growth type for the first performance and second performance of the application service when consuming the first platform service, wherein the first formula is with a highest quality to approximate the first performance and the second performance of the application service;
determine a scaling formula for the first platform service as an inverse formula of the first formula, the scaling formula defining a correspondence between a performance of the application service and a first service capacity of the first platform service provided for consumption by the application service, wherein the scaling formula is for calculating a first service capacity demand of the first platform service;
based on the generated set of formulas for the application service, determine maximum performance ranges for the application service while consuming the first testing service capacity of the first platform service and the second testing service capacity of the first platform service through interpolating the first performance and the second performance, wherein the determination of the maximum performance ranges for the application service further comprises, based on the first formula:
determine a first maximum performance range for the application service while consuming a low platform service capacity defined at a lowest point on a capacity limit range for the first platform service; and
determine a second maximum performance range for the application service while consuming a high platform service capacity defined at a highest point on the capacity limit range for the first platform service;
based on the scaling formula, determine a required capacity of the first platform service for a predefined performance of the application service by calculating the required capacity with the predefined performance of the application service as an input to the scaling formula; and
provision the first platform service with the required capacity of the first platform service.

11. The computer system of claim 10, further comprising instructions to:

define test input for the execution of the performance test on a running application service, wherein the instructions to define the test input further comprises instructions to:

define platform services and corresponding capacity limit ranges for instantiating platform service instances on capacity scales;

define the application service and performance measurement units for the application service define relationships between the application service and one or more of the platform services;

receive the performance test; and define a significance threshold for the performance test to determine whether a capacity of the consumed platform services affects performance of the application service.

12. A non-transitory computer-readable medium storing instructions, which when executed cause a computer system to:

execute a performance test on an application service while the application service is consuming a first testing service capacity provided through a set of first instances of a first platform service and while the application service is consuming a second testing service capacity provided through a second set of instances of the first platform service, wherein the first testing service capacity is different from the second testing service capacity;

measure, during the execution of the performance test, a first performance of the application service while consuming the first testing service capacity of the first platform service and a second performance of the application service while consuming the second testing service capacity of the first platform service;

generate a set of formulas for the application service to interpolate the first performance and the second performance of the application service during the execution of the performance test according to a set of interpolation methods;

determine a first formula from the set of formulas, the first formula defining a growth type for the first performance and second performance of the application service when consuming the first platform service, wherein the first formula is with a highest quality to approximate the first performance and the second performance of the application service;

determine a scaling formula for the first platform service as an inverse formula of the first formula, the scaling formula defining a correspondence between a performance of the application service and a first service capacity of the first platform service provided for consumption by the application service, wherein the scaling formula is for calculating a first service capacity demand of the first platform service;

based on the generated set of formulas for the application service, determine maximum performance ranges for the application service while consuming the first testing service capacity of the first platform service and the second testing service capacity of the first platform service through interpolating the first performance and the second performance, wherein the determination of the maximum performance ranges for the application service further comprises, based on the first formula:

determine a first maximum performance range for the application service while consuming a low platform service capacity defined at a lowest point on a capacity limit range for the first platform service; and determine a second maximum performance range for the application service while consuming a high platform service capacity defined at a highest point on the capacity limit range for the first platform service;

based on the scaling formula, determine a required capacity of the first platform service for a predefined performance of the application service by calculating the required capacity with the predefined performance of the application service as an input to the scaling formula; and provision the first platform service with the required capacity of the first platform service.

* * * * *